(12) United States Patent
Lindberg et al.

(10) Patent No.: US 7,805,270 B2
(45) Date of Patent: Sep. 28, 2010

(54) ENCODER SIGNAL ANALYSIS SYSTEM FOR HIGH-RESOLUTION POSITION MEASUREMENT

(75) Inventors: Paul M. Lindberg, San Diego, CA (US); Gary Schultze, Carlsbad, CA (US); Philip Hollingsworth, La Jolla, CA (US)

(73) Assignee: Moog Inc., East Aurora, NY (US)

( * ) Notice: Subject to any disclaimer, the term of this patent is extended or adjusted under 35 U.S.C. 154(b) by 721 days.

(21) Appl. No.: 11/702,783

(22) Filed: Feb. 5, 2007

(65) Prior Publication Data
US 2007/0205736 A1    Sep. 6, 2007

Related U.S. Application Data

(60) Provisional application No. 60/765,277, filed on Feb. 3, 2006.

(51) Int. Cl.
*H02P 5/00* (2006.01)
(52) U.S. Cl. .............................. 702/94; 702/57; 702/73; 702/85; 702/104; 702/106; 702/150; 702/151; 318/127; 318/128; 318/490; 318/560; 318/652

(58) Field of Classification Search ................... 702/57, 702/73, 85, 94, 104, 106, 150, 151; 318/127–128, 318/490, 560, 652
See application file for complete search history.

(56) References Cited

U.S. PATENT DOCUMENTS

| 5,933,106 | A  | * | 8/1999 | He et al. ..................... 341/116 |
| 2002/0019714 | A1 | * | 2/2002 | Carliale et al. ................ 702/73 |

* cited by examiner

*Primary Examiner*—Sujoy K Kundu
(74) *Attorney, Agent, or Firm*—Phillips Lytle LLP

(57) ABSTRACT

An apparatus and method for identifying the position of a magnetic shaft are provided. N field sensors are adjacently positioned at fixed locations relative to the shaft's periodic field, corresponding to 180/N relative phase shifts. A table provides N>2 predetermined signal models and a pre-identified position associated with each. An interpolator compares a representation of the N measured sensor signals to at least two predetermined models to generate a correction signal that provides another pre-identified position. The correction signal depends on N sensors for every position of the shaft. The correction signal is used to incrementally choose said another pre-identified position from the table as an approximate position of the shaft in an iterative process to find the minimum correction signal and identify the position.

15 Claims, 17 Drawing Sheets

ENCODER SIGNAL ANALYSIS SYSTEM FOR HIGH-RESOLUTION POSITION MEASUREMENT

CROSS-REFERENCE TO RELATED APPLICATIONS

This application claims priority to U.S. provisional application Ser. No. 60/765,277, filed on Feb. 3, 2006, entitled "Encoder Signal Analysis System For High-Resolution Position Measurement," the entirety of which is incorporated herein by reference.

FIELD OF THE INVENTION

This invention relates to the fields of accurate position measurement, including signal processing of sensed signals and the use thereof for motion control.

BACKGROUND OF THE INVENTION

Motion control refers to electromechanical systems which produce a desired motion in a mechanical load in response to a planned motion path. Such servo systems improve performance and productivity in automatic machinery used by manufacturing, testing, vibration control and other industries. In order to provide accurate motion control for these systems, it is necessary to accurately measure the position of the load.

FIG. 1 shows a typical prior art servo system 10 consisting of a motor 12, its moving load 14, a position sensor 16, including a stationary sensor head having two analog sensors thereon, a moving motor shaft 18 and an interpolator 20 which provides a digital signal and a servo controller 22 which uses an external digital signal and the digital signal from the interpolator 20 to provide a control signal to the motor 12 to achieve controlled linear motion. This invention can also be used to control rotary motion. The moving motor shaft 18 provides a field related to the magnet pole pair spacing thereof to be sensed, which varies along the length thereof. A measurement of the field detected by the sensors 16 can be correlated with the position of the motor shaft 18 relative to the stationary position of the motor. The variation can be sinusoidal along the length thereof or can vary in some other manner.

In one prior art system, two sensors 24 on the sensor head are located to detect a sinusoidally varying moving shaft field 25, the respective positions of the two sensor heads 24 being separated by a distance equal to 90 degrees of the sinusoidal signal period so that there is a sine signal and a cosine signal. Since the moving load 14 is driven by the moving motor shaft 18 the positions thereof are in a fixed relationship. The interpolator 20 converts easily detectable relatively coarse positioning data from the two sensors 24. The analog portions of the data from the two sensors are converted into a higher resolution signal for use by the motion control system 10 by manipulation thereof.

Typically the control signal is supplied to the system as electrical, but it can also take the form of pneumatic, hydraulic, or other power sources. The sensors can be of a type appropriate for the field being sensed, whether HALL or GMR devices for sensing magnetic flux density, or optical devices for sensing light, or other appropriate means of sensing a periodically varying field with respect to position.

It is well-known to use an arrangement of two position sensor elements as in FIG. 1 to directly output sensed signals in one of two commonly used incremental formats pictured in FIGS. 2A and 2B as for two periodic sensor signals, Analog A Quad B format 30 or in Digital A Quad B format 32.

The term incremental means that the position signal is provided in the form of electrical signals which can be used to provide a positional count by increments. The encoder signal supplied as two sine signals offset by 90 degrees (to comprise a sine/cosine pair) is commonly referred to as being in the Sin/Cos or Analog A Quad B format. The encoder signal supplied as two digital square wave signals, likewise offset in phase by 90 degrees is commonly referred to as being in the Digital A Quad B format.

If a position sensor array provides signals in either the Analog A Quad B format or in the Digital A Quad B format, a digital counter can keep track of a position measurement by counting the number of zero crossings of the sine and cosine signals over time. Since only four zero crossings are provided per electrical cycle, the zero crossing count resolution is coarse. As an example, this would provide a position measurement resolution of one quarter inch for those systems with a magnet pole pair spacing of one inch.

A common position resolution requirement in motion control is less than $1/2000^{th}$ of an inch, so it is desirable to achieve a much finer position resolution than that directly output by sensing the zero crossings of the pair of sensed analog field signals. Finer resolution is provided by an interpolator.

A prior art position interpolator, such as the interpolator 20 of FIG. 1, senses a sensor signal pair in the Analog A Quad B format 34 measured at a relatively coarse resolution and converts it into a Digital A Quad B format 36 at a higher equivalent resolution as described below and as illustrated in FIGS. 3A and 3B.

The motion control system 10 can receive this Digital A Quad B formatted signal 36 which is compared to signals representing the desired path 38 to provide servo positioning signals to drive the servo motor 12 with a greater degree of precision than possible without the interpolator 20. A Digital A Quad B formatted signal can also be used by the motor drive as commutation data for certain types of motors to generate drive signals.

Prior Art Interpolators

Interpolation is the process of subdividing the quarter cycle intervals into fractions thereof. Referring now to a prior art system 40 of FIG. 4 for identifying a position of a motor shaft 42 along a path 44, the shaft 42 and sensor 46 in combination convert the shaft position into a pair of signals defined by the shaft magnetic field 50, which in the prior art sinusoidal interpolator vary trigonometrically along the shaft.

The sinusoidal interpolator 54, commonly known as a "Sinusoidal Vector Follower," functions as follows. A pair of sensed sine/cosine signals 48 is combined using mathematical operations with a locally generated trigonometric signal 56 from signal generator module 60 to produce a single error signal 58. This error signal 58 represents a comparison between the common phase angle used to produce the sine and cosine signals 48 and a phase angle used to produce the locally generated trigonometric signal.

If the sine and cosine signals are matched, the common phase angle used to produce the sine and cosine signals is linearly related to the position of the shaft field and therefore is a linear function of the shaft position. If the sine and cosine signals are distorted instead of matched, the common phase angle used to produce the sine and cosine signals is non-linearly related to the position of the shaft field and therefore is a non-linear function of the shaft position.

The phase angle used to produce the locally generated trigonometric signal is determined by the interpolator circuitry to be a linear function of the interpolator output position. This may be accomplished as in FIG. 4 by converting the interpolator output position signal 62 to an index signal 66 to address a lookup table 62 containing a tangent lookup function. Lookup table 62 may be stored in memory, for example, in signal generator module 60.

In order to interpolate changes in shaft position which generate changes in phase angle greater than 360 degrees of phase, the index signal 66 can be generated as a modulus, or repeating function, so that the index signal addressing the table 62 can, upon reaching an address at the end of the table, wrap around to the beginning of the table 62.

As such, the error signal 58 indicates the direction in which to increment or decrement the locally generated angle or position signal to more closely approach the measured angle or position signal.

The position output can be formatted by appropriate operations for output to the motion system as a parallel digital word, or the position output may be converted to another format such as Digital A Quad B.

Common Sensor Signal Deviations

Sensor signals usually differ from ideal predicted values, and are often not necessarily trigonometric. If sensor signals were perfect, prior art system 40 described above could provide a completely linear output representation of the shaft position. However, the following variations in sensor signals commonly occur, some of which the prior art system cannot compensate for.

First of all, a distinction must be made between predicted variations and unpredicted variations. Unpredicted variations are those in which sensor signal variation from the ideal is not predicted, such as temperature and sensor distance from shaft, and for all other varying conditions, including sensor manufacture, which affect the manner in which the position sensor system operates. Such variations could be made predicted variations by performing scaling and offset operations on the sensor signals in response to measured conditions, or by calibrated test runs during sensor manufacture. For example, a difference in sensor offset voltage will occur in most Hall sensors at zero sensed field as a natural consequence of manufacturing tolerances. This offset voltage can be measured prior to sensor installation and supplied to the sensor system as an offset correction voltage as part of the normal interpolator operation.

Sensor signal wave shape can predictably vary due to sensor saturation, magnetic field distortion or other factors. For the example interpolator in FIG. 4, a lookup table or other such means can compensate for most predictable or predicted deviations of sensor signal wave shape from that of an ideal sine wave. However, unpredictable or unpredicted variations can not be anticipated and therefore require that the sensor compensate for them during interpolator operation.

Some parameters change as a function of shaft position from one cycle to the next, and can largely be predicted by "mapping" the deviations caused by shaft fabrication tolerances as a function of shaft position. The use by the interpolator of such "mapped" signal deviations is limited to those situations in which the interpolator circuitry can sense which positional shaft cycle is being measured at any given time.

As an example, if it can be predicted that one shaft magnet pole is shaped such that the sensor signal contains 1% total harmonic distortion and that the adjacent shaft magnet pole is shaped such that the sensor signal at that position contains 2% total harmonic distortion, then a lookup table could compensate for the output signal nonlinearities resulting from 1% or 2% total harmonic distortion respectively to achieve an accurate position output signal.

Such predictability disappears, however, if the shaft is moved while operating power is removed from the interpolator. The prior art interpolator as described here has no means of tracking the number of shaft cycles traversed by the interpolator while the interpolator is not operating. Accordingly, those parameters which change from one positional cycle to the next are also referred to herein as being unpredicted.

Unpredicted sensor signal deviations can include a) common amplitude, b) differential amplitude, c) offset voltage, d) electrical interference and noise (EMI), e) sensor signal nonlinearity due to changes in amplitude and temperature and f) changes in cycle pitch.

Methods for compensating changes in common amplitude are known in the prior art. Such changes can occur when the sine and cosine inputs of the interpolator deviate in amplitude by the same relative amount. Such deviations may occur due to unpredicted changes in distance of sensor head from the shaft ("ride height") and with shaft magnet temperature. Common amplitude changes are typically compensated for by the interpolator due to the ratiometric nature of the design, which compares a sine signal with its cosine counterpart multiplied by a tangent signal. Since a tangent signal is identical to the ratio of sine to cosine, the measurement is inherently ratiometric and therefore insensitive to such common amplitude deviations.

Limitations of the State of the Art Interpolators

It is desirable to provide a sensor capable of interpolating high resolution position with acceptable linearity using as inputs the typical sensor signals having substantially unpredicted deviations from a sinusoid due to the magnetic fields actually found in close physical proximity to motor shafts. Prior art sinusoidal interpolators suffer a number of disadvantages in their design which render them incapable of producing linear position output signals in the presence of such and other sensor signal deviations. Two examples of these disadvantages are: a) dependency upon one sensor signal; and b) sensor signal distortion.

As described above in reference to FIGS. 2A-3B, prior art sinusoidal interpolators are designed so that there exist at least four positions within the interpolation cycle in which the position output signal depends upon one sensor signal alone. This results in a change in the position output signal in proportion to the deviation in a sensor signal at quarter cycle intervals. In particular, referring to FIGS. 4 and 5, an error signal calculator 68 of prior art interpolator 54 produces error signal 58 from the sum of a sine sensor signal measurement and the product of a cosine signal multiplied by a modeled trigonometric (tangent) signal 56.

At a shaft position corresponding to 90 and 270 degrees of phase, the tangent signal becomes very large. Theoretically, the tangent signal becomes infinite, but in practice, the phase angle results in a tangent value of over 100. As a consequence, the cosine sensor signal becomes scaled by a much higher factor than the sine sensor signal. Following this reasoning, the prior art interpolator largely ignores the sine sensor signal at shaft positions corresponding to 90 and 270 degrees of phase.

Conversely, at a shaft position corresponding to 0 and 180 degrees of phase, the tangent signal becomes very small. Theoretically, the tangent signal becomes zero, but in practice, the phase angle results in a tangent value of much less than one. As a consequence, the cosine sensor signal becomes scaled by a much lower factor than the sine sensor signal.

Following this reasoning, the prior art interpolator largely ignores the cosine sensor signal at shaft positions corresponding to 0 and 180 degrees of phase. Accordingly, because the prior art interpolator error calculation depends upon one sensor only at four positions, its position output signal is subject to errors which are directly proportional to sensor signal distortion and noise near these positions.

Position signal output nonlinearities are a second limitation of prior art interpolations. Such nonlinearities can be caused by deviations in differential signal amplitude. When one sensor on the leading edge of the array enters a shaft field region where the magnetic field, due to tolerances in magnet manufacture, is of different amplitude, the one sensor may exhibit an unpredicted change in signal amplitude relative to that of the trailing sensor which remains in the original shaft region. A position output signal error will result which is proportional to the differential signal amplitude error near those shaft positions of 0, 90, 180 and 270 degrees.

A position output signal error will also result from unpredicted offset voltage output which can occur at shaft positions where a zero sensed magnetic field is normally expected. This will result when the normally periodic shaft magnetic field is influenced by slowly varying interferences such as fringing fields sensed near the ends of the shaft. Accordingly, the position output signal error will be proportional to the offset voltage error near those shaft positions of 0, 90, 180 and 270 degrees.

Position output signal noise will also result from electromagnetic interference (EMI). EMI can be unpredicted or chaotic. As a result, the position error will be proportional to the amplitude of the EMI near shaft positions of 0, 90, 180 and 270 degrees.

Unpredicted sensor signal nonlinearities can also result in position output signal errors. Signal nonlinearities occur, among other reasons, when varying magnet strength changes the field amplitude into a region of sensor output saturation. The resulting non sinusoidal signal will then fail to match the trigonometric model and the output position signal will become nonlinear.

Fabrication tolerances during shaft manufacture can result in output signal nonlinearities. Sensed signals can vary in phase with respect to one another relative to the resulting variable distance between magnet pole pairs on the shaft. An unexpectedly large shaft pitch will cause the sensors to be less than 90 degrees out of phase, whereas an unexpectedly small shaft pitch will cause the sensors to be greater than 90 degrees out of phase. The resulting signal will then fail to match the trigonometric model and the output position signal will become nonlinear.

Because prior art interpolators are vulnerable to unpredicted variations in sensor signals, and because motion control applications require high levels of accuracy, it is desirable to provide an improved interpolator which can provide a highly linear output position signal in the presence of substantial sensor signal distortion.

BRIEF DESCRIPTION OF THE INVENTION

Figure 1:
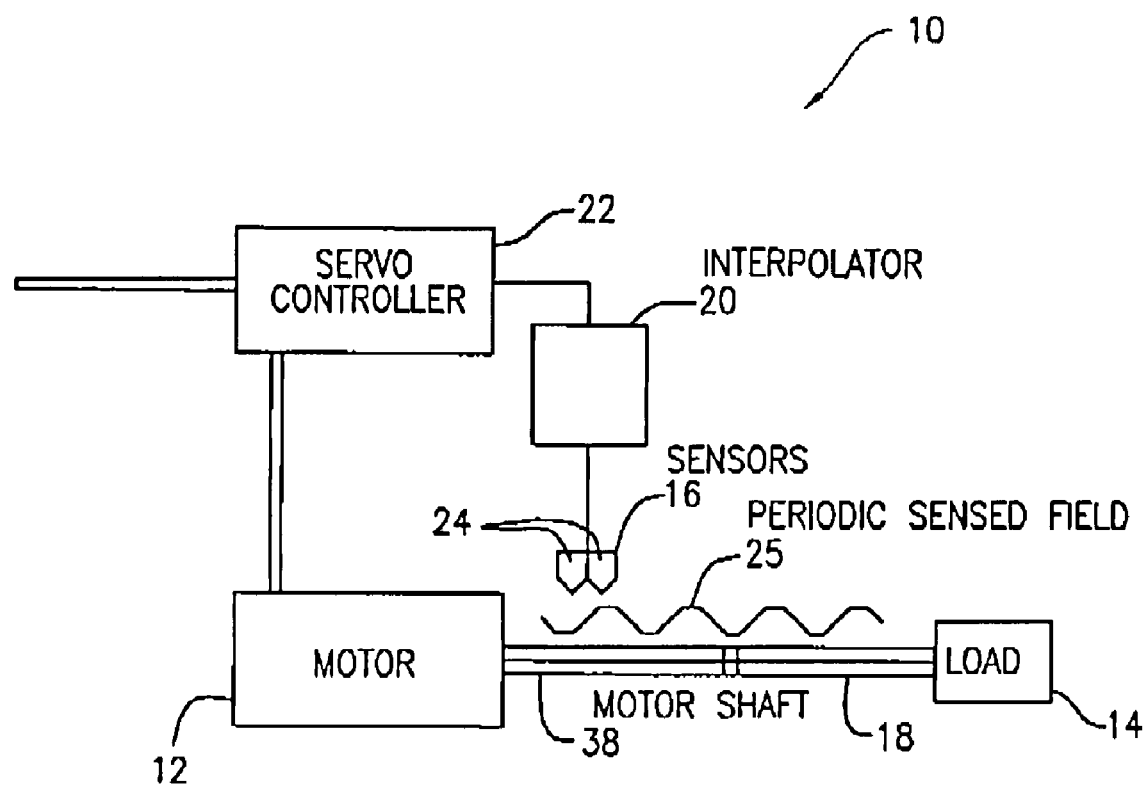
FIG. 1 is a schematic representation of a prior art servo system using stationary sensor head.
Figure 2A:
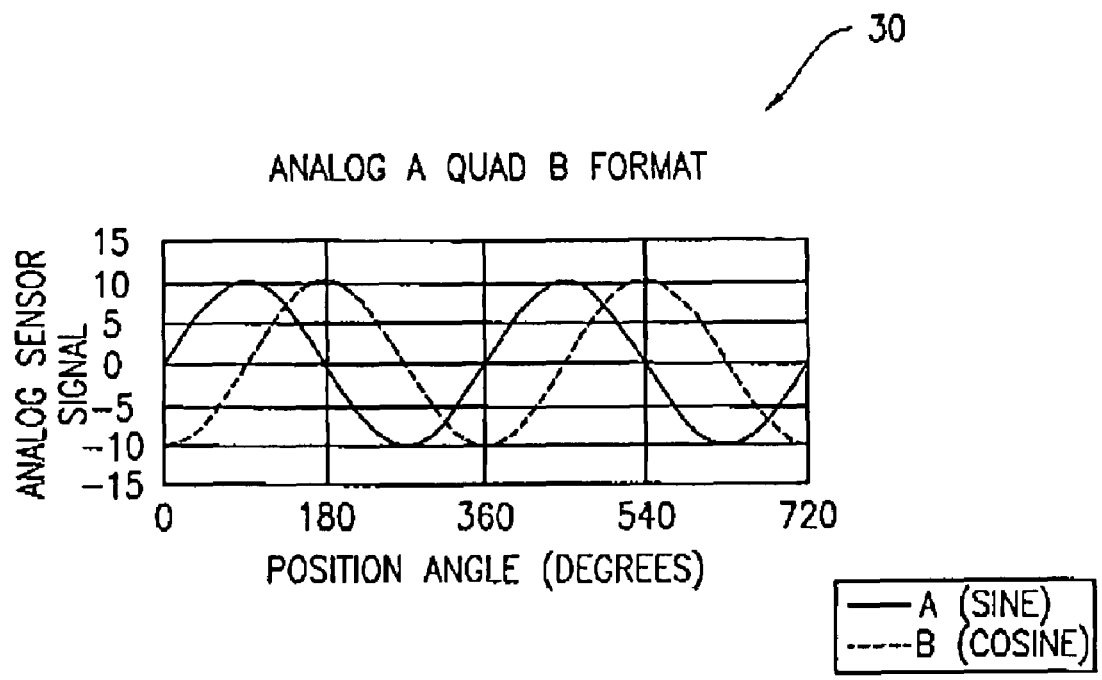
FIG. 2A is a plot of a known Analog position signal format.
Figure 2B:
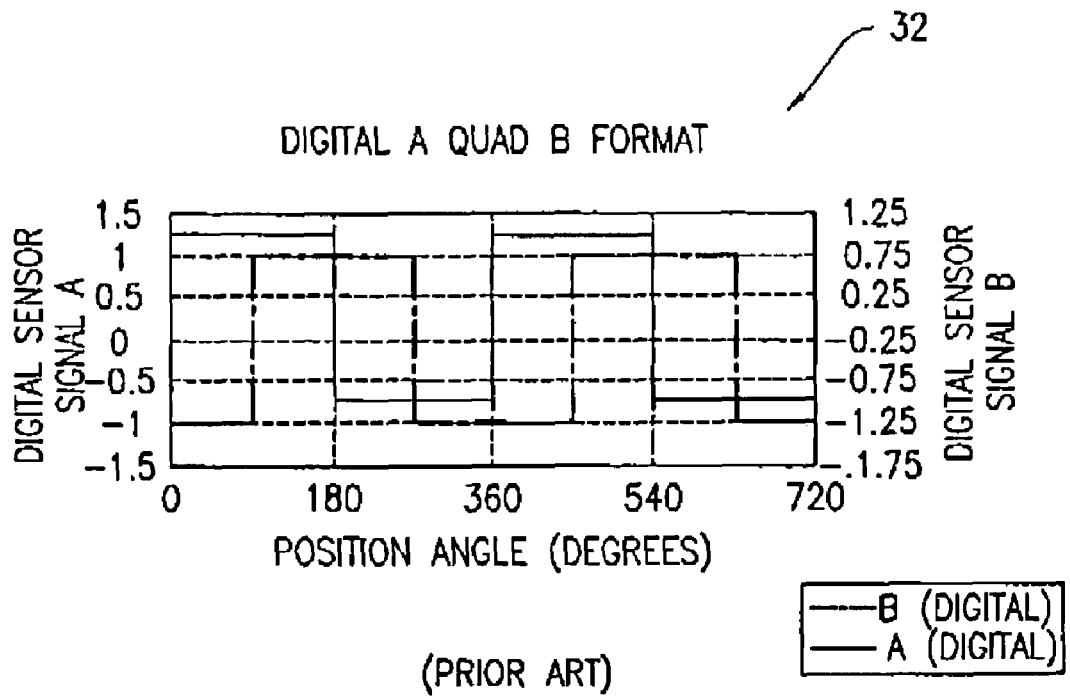
FIG. 2B is a plot of a known Digital A Quad B position signal format.
Figure 3A:
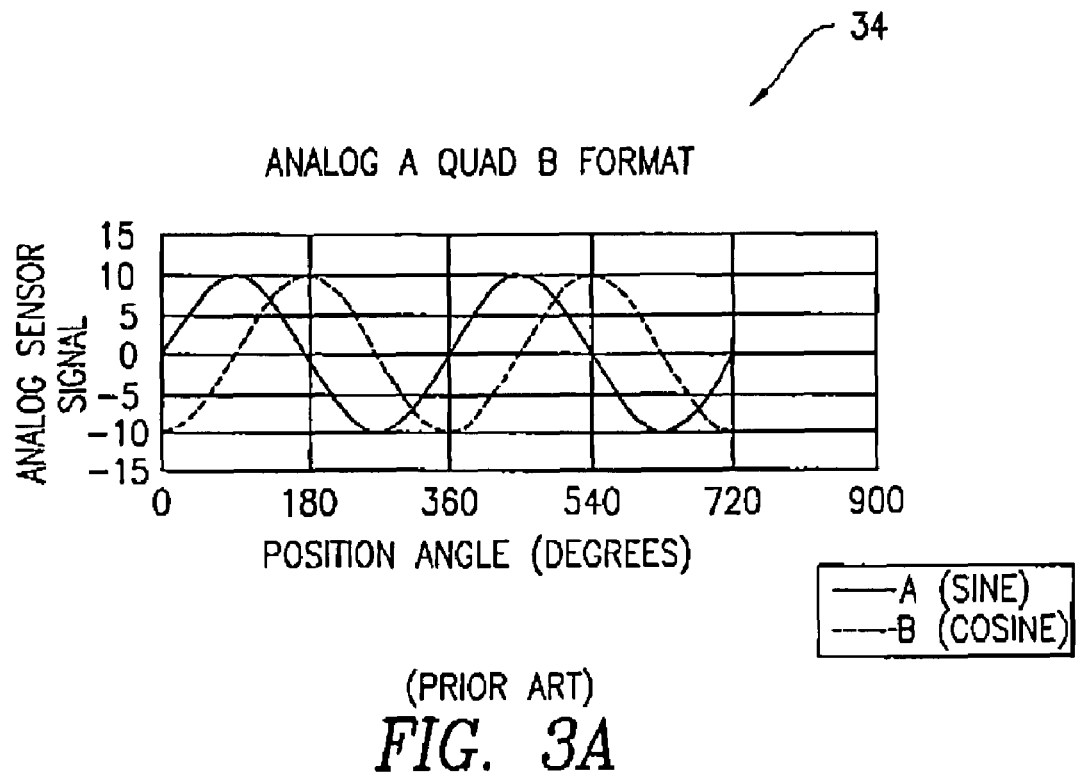
FIG. 3A is a plot of a position signal in Analog A Quad B format measured at a relatively coarse resolution.
Figure 3B:
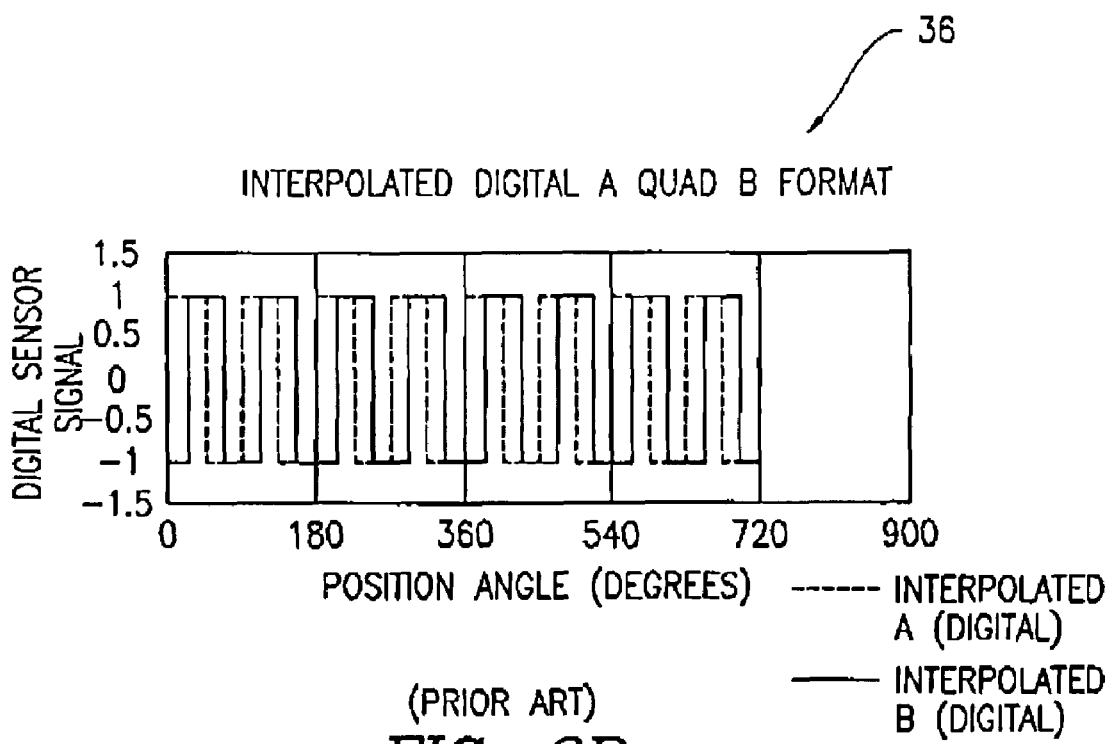
FIG. 3B is a plot of a position signal in Digital A Quad B format at a relatively high resolution.
Figure 4:
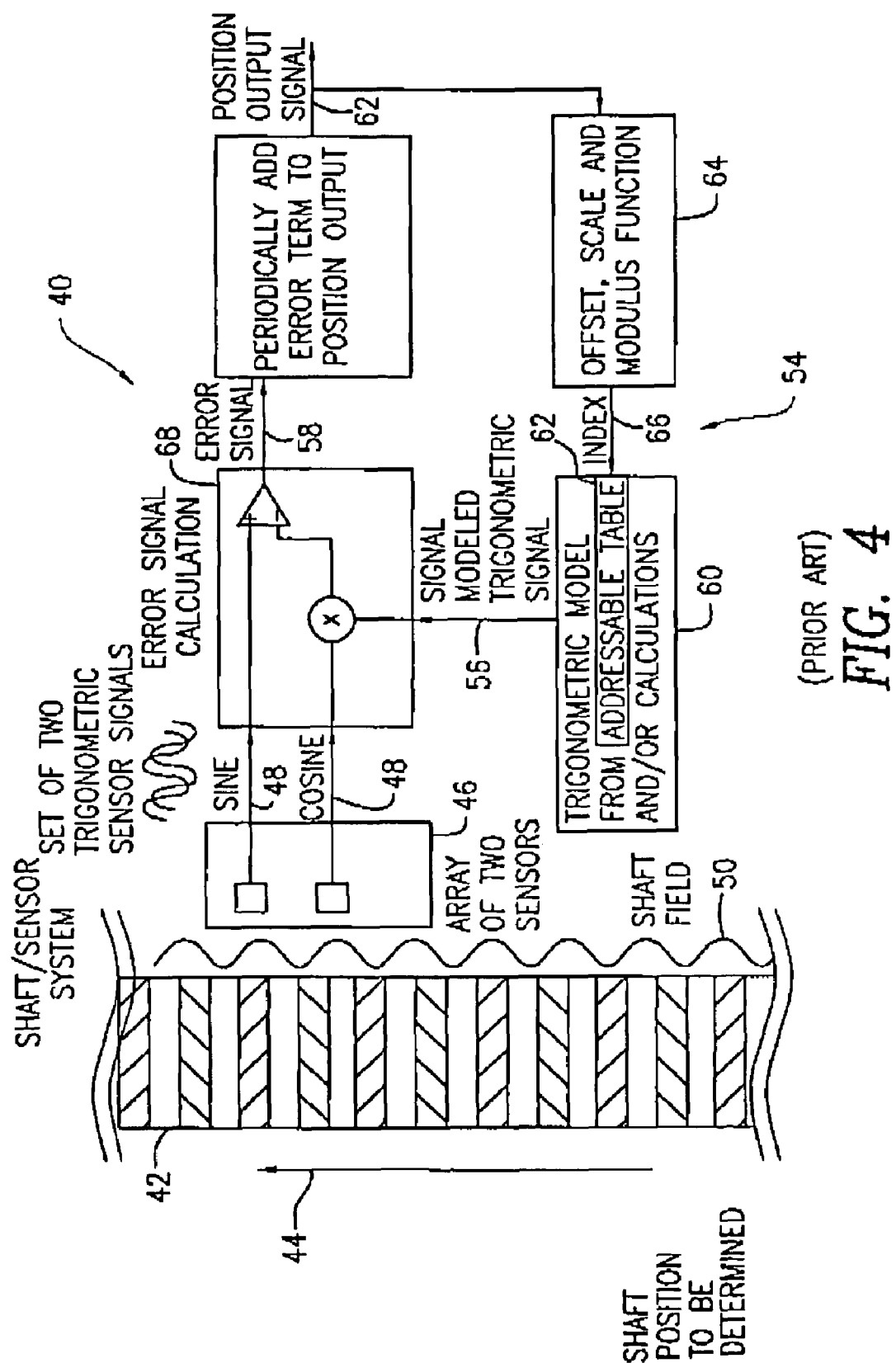
FIG. 4 is a block diagram of a system for position measurement using prior art sinusoidal signal conversion to an interpolated position signal.
Figure 5:
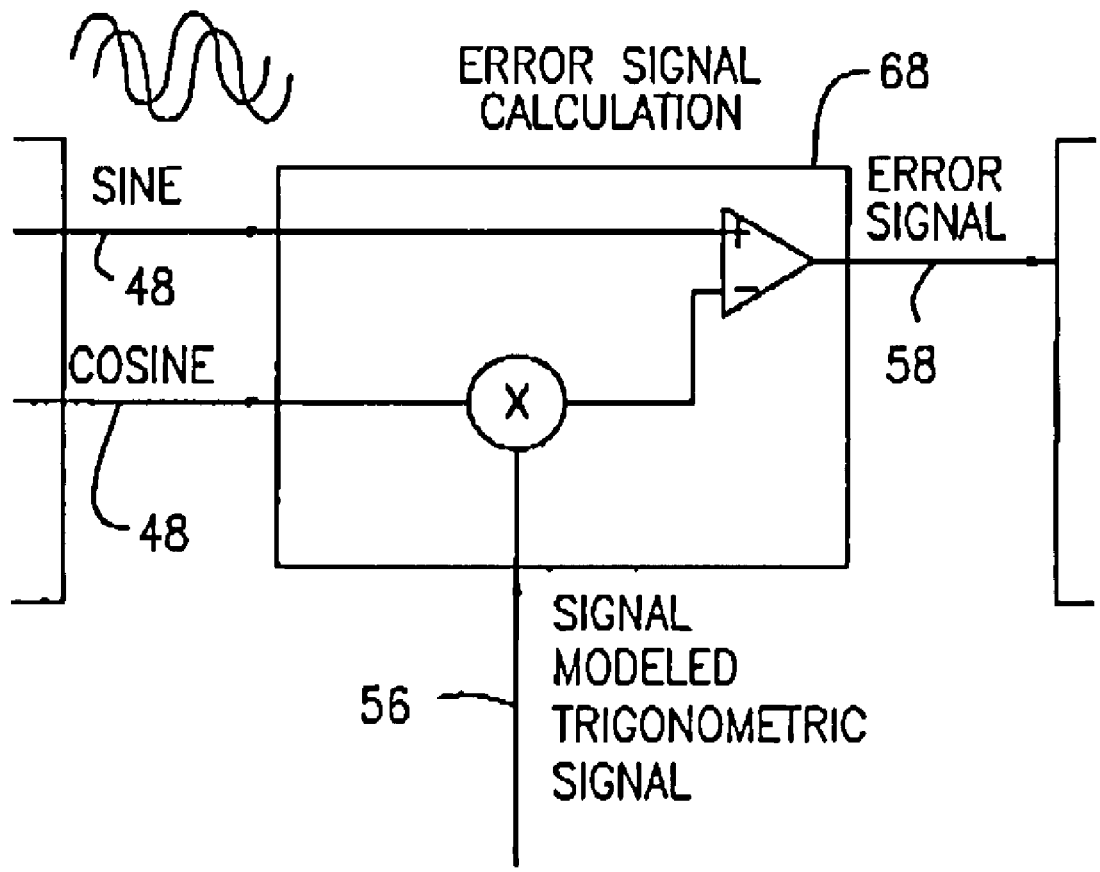
FIG. 5 is a schematic representation of error signal calculation in the prior art interpolator of FIG. 4.

The present invention provides a method for identifying the position of a first member relative to a defined path, which is defined by a second member. One of the members provides a periodic field along at least a portion of the defined path, and an array of spaced field sensors is provided at fixed locations with respect to the member not providing the periodic field. The method includes: (a) providing a plurality of predetermined sets of N sequentially ordered values, where N is greater than 2, where each set is associated with a pre-identified position of the first member relative to the defined path; and (b) providing the array of spaced field sensors positioned at fixed locations with respect to the member not providing the periodic field and adjacent to at least a portion of the defined path. Each field sensor senses the portion of the periodic field at its fixed location and thereby generates a sensor signal in response thereto. A set of N sensor signals in a predetermined sequence is then generated from the sensor signals, which is associated with the position of the first member relative to the defined path.

The method further includes: (c) comparing the set of N sensor signals to a first one of the plurality of predetermined sets of N sequentially ordered values associated with a first pre-identified position to generate a correction signal; and (d) using the correction signal to choose another pre-identified position associated with another one of the plurality of predetermined sets as an approximation of the position of the first member relative to the defined path; and (e) generating a position output signal associated with the approximation of the position from step (d).

The method preferably further includes (f) setting the first one of the plurality of predetermined sets in step (c) to the other one of the plurality of predetermined sets associated with the other pre-identified position chosen in step (d) as the approximation of the position in response to the generating step (e), and iteratively repeating steps (c), (d), and (e) to find the minimum correction signal, thereby identifying the position of the first member relative to the defined path.

The comparing step (c) preferably includes calculating a square of the magnitude of the difference between the set of N sensor signals and at least the first one and a second one of the plurality of predetermined sets of N ordered values for each of at least the first and second predetermined sets to generate at least two error values that are a function of pre-identified position.

The comparing step (c) also preferably includes using the at least two error values to calculate a slope of the function at the first pre-identified position in order to determine a direction and amount by which the error function (at least two error values) changes as a function of pre-identified position at the first pre-identified position change.

The comparing step (c) also preferably includes multiplying the slope by a scaling factor to generate a correction value associated with the correction signal.

The method can also include subtracting the correction value from the first pre-identified position in using step (d) to choose the other (another) pre-identified position.

The correction value corresponds to the minimum correction signal in one aspect when each of the slope and the correction value is zero, and the other pre-identified position equals the first pre-identified position, so that the output position signal identifies the position of the first member relative to the defined path.

In one aspect of the method of the present invention, the scaling factor is a positive or negative constant value. In this aspect, the scaling factor can be initially set by a user, for example, although it may be manually adjusted at a later time, as desired.

In another aspect of the method of the present invention, the scaling factor is automatically adjusted at every iteration of the comparing step. Such automatic adjustment is preferably optimized, for example, to provide a smaller iterative change in pre-identified position as the measured slope in the error function becomes smaller.

In the method of the present invention, the providing step (a) preferably includes a table of the plurality of predetermined sets of N ordered values indexed by the pre-identified positions associated therewith, and the using step (d) includes stepping an index pointer in the lookup table to choose the other (another) pre-identified position.

The table can be stored in addressable memory locations, the method further including calculating the index pointer from a scaled representation of the pre-identified positions, wherein the index pointer is stepped by addressing the addressable memory locations to choose the other pre-identified position.

In one aspect, the method of the present invention further includes identifying the position of the first member relative to the defined path of moving first member in a time interval less than a time of travel of the first member from a first position to a second position, allowing continuous dynamic measurement of position. In accordance with this aspect, the position can be determined in the iterative feedback loop before the moving member reaches the second position (one step) by providing a response time T of the feedback loop less than an inverse of the velocity of a moving member in steps per second, i.e., $\tau<(\text{steps/second})^{-1}$.

The method of the present invention can be implemented with the array of spaced field sensors including M sensors spaced by a distance corresponding to a non-zero integer multiple of 180/M degrees of the periodic field.

In one aspect, M equals N, and each of the spaced sensors provides one of the N sensor signals.

In another aspect, M equals two times N, and the providing step (b) includes providing the array as N pairs of spaced field sensors, each pair including one field sensor physically located relative to the other field sensor to sense the periodic field shifted in phase by 180 degrees relative to the other field sensor. The array generates N combined sensor signals from the sensor signals to provide the set of N sensor signals associated with the position. The method further includes generating the N combined sensor signals by subtracting one sensor signal generated by the one field sensor in a pair from a second sensor signal generated by the other field sensor in the pair, for each of the N pairs of field sensors. Because of the 180 degree phasing between the paired sensors, slow field offset variations are substantially compensated for. In addition, the signal to noise is generally improved by using two sensors to generate each of N sensor signals for use in the interpolation.

The present invention also provides an apparatus for identifying the position of a first member relative to a defined path, which is defined by a second member. One of the members provides a periodic field along at least a portion of the defined path, and an array of spaced field sensors is provided at fixed locations with respect to the member not providing the periodic field. The apparatus includes a storage means including an addressable table with a plurality of predetermined sets of N sequentially ordered values, where N is greater than 2, and a value for a pre-identified position associated with each predetermined set. The apparatus further includes an array of spaced field sensors positioned at fixed locations with respect to the member not providing the periodic field and adjacent to at least a portion of the defined path. Each of the field sensors senses the portion of the periodic field at its fixed location and thereby generates a sensor signal in response thereto.

Also included is a statistical interpolator including an error signal calculation module and an interpolation module. The error signal calculation module includes a sensor signal processing circuit operably connected to the array for receiving the sensor signals. The sensor signal processing circuit generates a set of N sensor signals in a predetermined sequence associated with the position of the first member in response to the sensor signals. The error signal calculation module is also operably connected to the storage means for selectively receiving the plurality of predetermined sets of N sequentially ordered values, and further includes a comparator for comparing the set of N sensor signals to at least one of the plurality of predetermined sets of N ordered values associated with one pre-identified position to generate a correction signal based on the set of N sensor signals. The correction signal is determined by at least two predetermined sets and depends on the N sensor signals for every position of the first member relative to the defined path.

The statistical interpolator also includes an interpolation module operably connected to the error signal calculation module to receive the correction signal and to return an indexing signal associated with another pre-identified position to the error signal calculation module. The statistical interpolator is programmed to use the correction signal to incrementally choose another pre-identified position from the table as an approximation of the position of the first member in an iterative process to find the minimum correction signal and to thereby identify the position of the first member relative to the defined path.

The array of spaced field sensors preferably includes M field sensors spaced by a distance corresponding to a non-zero integer multiple of 180/M degrees of the periodic field.

In one aspect, the apparatus includes M equals N field sensors, each of the spaced sensors providing one of the N sensor signals in the predetermined sequence.

In one aspect, M is equal to 3.

In another aspect, M equals two times N, the array including N pairs of regularly spaced field sensors, each pair including one field sensor physically located relative to the other field sensor to sense the periodic field shifted in phase by 180 degrees relative to the other field sensor. The sensor signal processing circuit includes a differential circuit for each of the N pairs to subtract one of a pair of sensor signals from the other to generate the set of N sensor signals associated with the position of the first member, thereby substantially compensating for slow field offset variations.

The periodic field of the apparatus of the present invention can be provided by an array of permanent magnets on the shaft of a linear motor. In this aspect, the field sensors are magnetic sensors. The magnetic sensors can include either Hall sensors or magnetoresistive sensors or some combination of both.

In one aspect, the statistical interpolator includes a digital signal processor.

Preferably, the comparator of the apparatus of the present invention is adapted to calculate a square of the magnitude of the difference between the set of N sensor signals and at least two of the plurality of predetermined sets of N sequentially ordered values—those associated with the (first) one and a second pre-identified position to generate at least two error values that are a function of pre-identified position at the first pre-identified position. The comparator then calculates a slope of the function defined by the at least two error values to determine a direction and amount by which the error function of at least two error values changes as a function of pre-identified position at the (first) one of the pre-determined positions. The slope is then multiplied by a scaling factor to generate a correction value associated with the correction signal.

The interpolation module is preferably adapted to subtract the correction value from the first pre-identified position to choose another pre-identified position.

In one aspect, the storage means of the apparatus preferably includes memory having addressable memory locations, wherein the statistical interpolator includes an index pointer associated with the indexing signal. The index pointer is calculated or provided as a scaled representation of the pre-identified positions, and the statistical interpolator is adapted to address the addressable memory locations using the index pointer to choose another pre-identified position.

Of course, the error function for a set of N sensor signals could also be calculated for the entire table of predetermined sets of values to generate an entire curve, but it is more efficient and, therefore, preferable to calculate only a number of error values needed to determine the slope at a pre-identified position, in order to determine the next pre-identified position to use as an approximation of the position of the first member.

Alternatively, and in a broader sense, the error function can be determined by providing a mathematical representation of a set of N sensor signals, and providing a plurality of mathematically representative predetermined sensor signal models, each associated with a pre-identified position of the first member relative to the defined path. The mathematical representation of the set of N sensor signals is compared to a first mathematically representative predetermined sensor signal model associated with a first pre-identified position to generate a correction signal. The correction signal is used to provide another pre-identified position associated with another one of the mathematically representative predetermined sensor signal models to be compared to the mathematical representation of the set of N sensor signals.

The mathematically representative predetermined sensor signal models and the mathematical representation of each set of N sensor signals can be provided, for example, in any appropriate vector form.

Accordingly, the present invention includes a method for identifying the position of a first member relative to a defined path, the path being defined by a second member; one of the first and second member providing a periodic field along at least a portion of the defined path. The method includes: (a) providing an array of more than two (2) spaced field sensors positioned at fixed locations with respect to the one of the first and second member not providing the periodic field and adjacent to at least a portion of the defined path, each of the field sensors sensing the portion of the periodic field at its fixed location and thereby generating a sensor signal in response thereto to provide a set of N sensor signals in a predetermined sequence associated with the position of the first member relative to the defined path, where N is greater than two (2); (b) providing a plurality of mathematically representative predetermined sensor signal models, each associated with a pre-identified position of the first member relative to the defined path; (c) comparing a mathematical representation of the set of N sensor signals to a first one of the plurality of mathematically representative predetermined sensor signal models associated with a first of the pre-identified positions to generate a correction signal; and (d) using the correction signal to generate an output position signal and to provide another one of the pre-identified positions associated with another one of the plurality of predetermined sensor signal models to be compared to the mathematical representation of the set of N sensor signals.

The method also preferably includes (e) iteratively repeating steps (c), and (d) to find a minimum correction signal, thereby identifying the position of the first member relative to the defined path.

In one aspect, the method includes the mathematical representation of the N set of sensor signals being provided as a vector representation. The comparing step (c) then preferably includes (i) generating a vector representation for at least a first one and a second one of the plurality of mathematically representative predetermined sensor signal models associated with a first and a second pre-identified position respectively; (ii) calculating at least two error signals, an error signal being calculated as a square of the magnitude of a difference between the vector representation of the set of N sensor signals and the first vector representation of the plurality of mathematically representative predetermined sensor signal models and an error signal being calculated as a square of the magnitude of a difference between the vector representation of the set of N sensor signals and the second one of the vector representations of the plurality of mathematically representative predetermined sensor signal models to generate at least two error values that are a function of pre-identified position. The comparing step further preferably includes calculating a slope of the function defined by the at least two error values to determine a direction and an amount by which the at least two error values change as a function of pre-identified position at the first pre-identified position; and multiplying the slope by a scaling factor to generate a correction value associated with the correction signal.

In one aspect, the using step (d) includes subtracting the correction value from the first pre-identified position to provide the another pre-identified position.

In one aspect, the correction value corresponds to the minimum correction signal, each of the slope and the correction value is zero, the another pre-identified position equals the first pre-identified position, and the output position signal identifies the first pre-identified position as the position of the first member relative to the defined path.

In one aspect of the method, the scaling factor is a positive or negative constant value. In another aspect, the scaling factor is automatically adjusted at every iteration of the comparing step.

The providing step (b) can include providing a table of the plurality of mathematically representative predetermined sensor signal models indexed by the pre-identified positions associated therewith, and the using step (d) can include using the output position signal to step an index pointer in the table to provide the another pre-identified position.

In one aspect of the method, the array of spaced field sensors comprises M sensors spaced by a distance corresponding to a non-zero integer multiple of 180/M degrees of the periodic field.

In one aspect, M equals N, and each of the spaced sensors provides one of the N sensor signals in the set of the N sensor signals.

In another aspect, M equals 2N, and the providing step (a) includes providing the array as N pairs of regularly spaced field sensors, each pair including one field sensor physically located relative to the other field sensor to sense the periodic field shifted in phase by 180 degrees relative to the other field sensor, the array generating N combined sensor signals from the sensor signals to provide the set of N sensor signals in the predetermined sequence associated with the position, the method further including generating the N combined sensor signals by subtracting one sensor signal generated by the one field sensor generated by a second sensor signal from the other field sensor for each of the N pairs, thereby substantially compensating for slow field offset variations.

The present invention further provides an apparatus for identifying the position of a first member relative to a defined path; the path being defined by a second member; one of the first and second member providing a periodic field along at least a portion of the defined path.

The apparatus includes an array of spaced field sensors of number greater than two (2) positioned at fixed locations with respect to the one of the first and second member not providing the periodic field and adjacent to at least a portion of the defined path, each of the field sensors sensing the portion of the periodic field at its fixed location and thereby generating a sensor signal in response thereto. The apparatus also includes: a storage means, which includes an addressable table including a plurality of mathematically representative predetermined sensor signal models and a value for a pre-identified position associated with each; and a statistical interpolator including an error signal calculation module and an interpolation module.

The error signal calculation module includes a sensor signal processing circuit operably connected to the array for receiving the sensor signals, the sensor signal processing circuit generating a set of N sensor signals in a predetermined sequence associated with the position of the first member in response to the sensor signals. The error signal calculation module is also operably connected to the storage means for selectively receiving the plurality of mathematically representative predetermined sensor signal models. The error signal calculation module further includes a comparator for comparing a mathematical representation of the set of N sensor signals to at least one of the plurality of mathematically representative predetermined sensor signal models associated with one pre-identified position to generate a correction signal based on the set of N sensor signals, wherein the correction signal is determined by comparing the at least one of the plurality or mathematically representative predetermined signal models to the mathematical representation set of the set of N signals for every position of the first member relative to the defined path.

The interpolator module is operably connected to the error signal calculation module to receive the correction signal and to return an indexing signal associated with another pre-identified position to the error signal calculation module. The statistical interpolator is programmed to use the correction signal to incrementally choose the another pre-identified position from the table as an approximation of the position of the first member in an iterative process to find the minimum correction signal and to thereby identify the position of the first member relative to the defined path.

In one aspect of the apparatus, the array of spaced field sensors includes M field sensors spaced by a distance corresponding to a non-zero integer multiple of 180/M degrees of the periodic field.

In one aspect, M equals N and each of the spaced sensors provides one of the N sensor signals. In another aspect, M equals N, each of which is equal to 3.

In another aspect, M equals two times N, and the array includes N pairs of regularly spaced field sensors, each pair including one field sensor physically located relative to the other field sensor to sense the periodic field shifted in phase by 180 degrees relative to the other field sensor. In this aspect, the sensor signal processing circuit includes a differential circuit for each of the N pairs to subtract one of a pair of sensor signals from the other to generate the set of N sensor signals associated with the position of the first member, thereby substantially compensating for slow field offset variations.

In one aspect, the periodic field for the apparatus is provided by an array of permanent magnets on the shaft of a linear motor, and the field sensors are magnetic sensors. In one aspect, the magnetic sensors comprise Hall sensors or magnetoresistive sensors or a combination of both types.

Preferably, the statistical interpolator comprises a digital signal processor.

In one aspect, the comparator of the apparatus is adapted to: (i) calculate a square of the magnitude of a vector difference between the mathematical representation of the set of N sensor signals and a vector representation of each of the one of and a second one of the plurality of mathematically representative predetermined sets of N ordered values associated with a second pre-identified position for each of at least the one and the second mathematically representative predetermined sets to generate at least two error values that are a function of pre-identified position; (ii) calculate a slope of the function defined by the at least two error values to determine a direction and amount by which the at least two error values change as a function of pre-identified position; and (iii) multiply the slope by a scaling factor to generate a correction value associated with the correction signal.

The interpolation module can then be adapted to subtract the correction value from the one pre-identified position to generate the indexing signal for providing the another pre-identified position.

The storage means can include memory having addressable memory locations, wherein the statistical interpolator comprises an index pointer associated with the indexing signal, the index pointer being a scaled representation of the pre-identified positions. The statistical interpolator is then adapted to address the addressable memory locations using the index pointer to choose the another pre-identified position.

DETAILED DESCRIPTION OF THE INVENTION

Returning to FIG. 6, the invention provides a method and apparatus 70 for statistical interpolation of sensor signal data in such a manner as to provide improved linearity over prior art interpolators. The apparatus 70 includes a statistical interpolator 72 that interpolates the output signals 74 of a sensor array 76 consisting of N sensors 78, where N is greater than 2, wherein the sensors are placed so that their outputs 74 are shifted in phase preferably by 180/N degrees, or a multiple thereof, and outputs a signal 80 representing the position of the sensors 78 relative to a periodic sensed field 82. The statistical interpolator and method of identifying a position by statistical interpolation of the present invention are preferably implemented in a digital signal processor, but can be any combination of software instructions in a programmable processor or processors and hardware for implementing the methods described herein.

An appropriate number N of sensors 78 are spaced to provide an appropriate relative phase between sensors 78 to eliminate any positions along the shaft range of motion in which the output position signal 80 depends on only one sensor. For many common sensor signal wave shapes, such a condition is met if three or more sensors are placed so that their outputs are shifted in phase by 180/N degrees, or a multiple thereof. Other phasing arrangements are also contemplated to provide the desired output position signal 80, depending on the sensor signal wave shape. As will be explained, the unpredicted errors in the measured sensor signals will add in a smaller than proportional manner when more than one sensor signal is used in a positional error calculation. The resulting signal to noise ratio will mitigate the position output errors resulting from sensor signal distortion and noise.

In the preferred embodiment, the output position signal 80 is calculated using the statistical method and apparatus described below.

Figure 6:
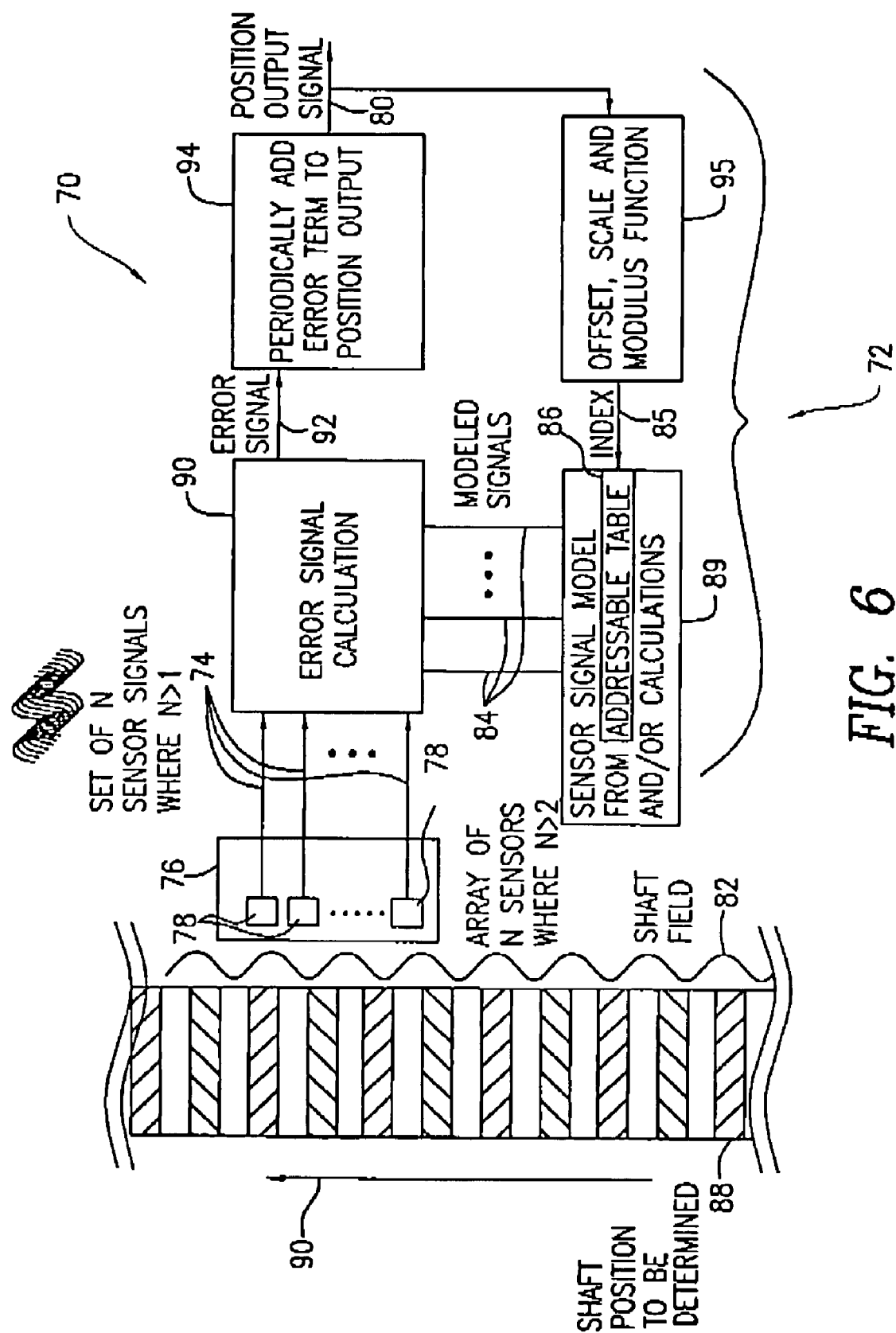
FIG. 6 is a block diagram of an embodiment of a system for identifying a position of a member (e.g., a motor shaft) in accordance with the present invention.

The interpolator 72 described by FIG. 6 receives output signals which comprise an array of signals $S_i(Xa)$ consisting of a number N of sensor signals 74 which are dependent on actual shaft position Xa. Modeled sensor data 84 can be provided by a sensor signal model module 89, which embodies a step for providing predetermined sensor signal models for each pre-identified position. The sensor signal models can be provided as any mathematically representative predetermined sensor signal model that can be used to represent the measured N sensor signal values. Accordingly, the sensor signal models can be compared to an appropriate mathematical representation of a set of N sensor signals in order to generate a corrective signal used to determine the position.

In one embodiment discussed in detail herein, the sensor signal models can represent the sets of N measured sensor signals as predetermined sets of N values. Each set of sensor data 84 is dependent on calculated position output Xe, and is used to calculate a new value of position output Xe which is closer to the actual position Xa than to the previous position output Xe. In one embodiment, the dependent sensor signals are stored in a look-up table 86 indexed by Xe or calculated from Xe. Accordingly, the output position signal 80 can be used to determine an index signal 85 to choose the new value of position output Xe.

Figure 7:
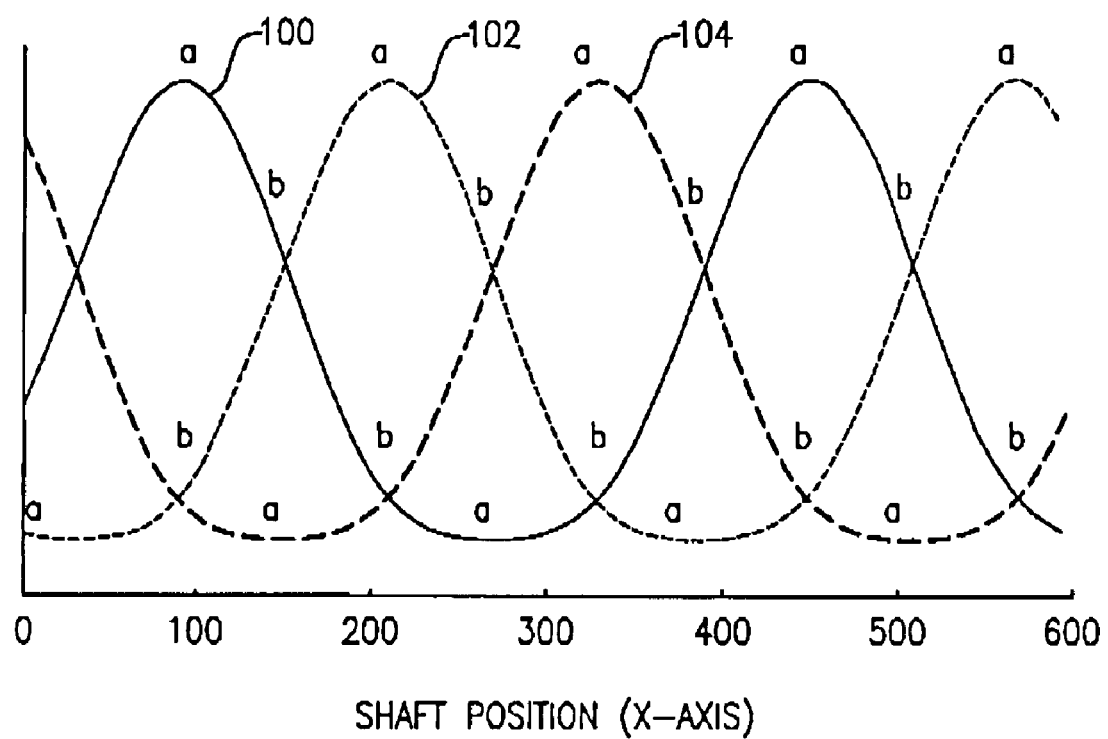
FIG. 7 is a representation of a plot of sensor signals generated in an embodiment of the system of FIG. 6, for a number of sensors N, where N equals 3, and mutual phase offset is 120 degrees.

The motor shaft 88 and sensor array 76 are arranged so that the N sensors 78 are situated at such physical locations to provide a predetermined relative phase. The relative phase between the sensors 78 is chosen so that there are at least two sensors for any positions along a path 90 within the shaft range of motion with substantial signal variations as a function of shaft positional change. As an example, as shown in FIG. 7, a relative phase of 120 degrees between sensors is used in an array consisting of N sensors, where N=3, so that 180/N is multiplied by 2. Other combinations of the number of sensors N and relative phase offset between sensors can be used and are within the scope of the invention as long as there are no positions along the shaft range of motion in which only one of the N sensors in the array exhibits a substantial slope of signal value with respect to shaft positional change. One skilled in the art will appreciate by inspection of FIG. 7 that the choice of wave shape and number of sensors N will influence the requirements placed on the selection of relative phase angle between sensors.

Referring still to FIG. 7, for every Shaft Position (a) on the x-axis in which the slope of any given sensor signal 100 is zero or close to zero, there is a set (b) of two other sensor signals 102 and 104 for which the slope is very steep, with a strong correlation between each of their respective rates of change and the actual shaft position. By using a method of calculation which responds to the slope of the sensor signal of each one of N sensors, where N is greater than 2, the invention always possesses enough information to calculate the position output signal on the basis of more than one sensor signal.

The calculation of this position output signal 80 involves the calculation of an error term and error (correction) signal 92 by a statistical error signal calculator 90, which embodies steps for comparing a pre-determined set of N values to a set of measured sensor signals. Error can be calculated as in the following example in which the number N of sensors is 3 and in which the three sensors are positionally offset from one another by 120 degrees of sensed periodic field, as shown in FIG. 7.

Figure 8A:
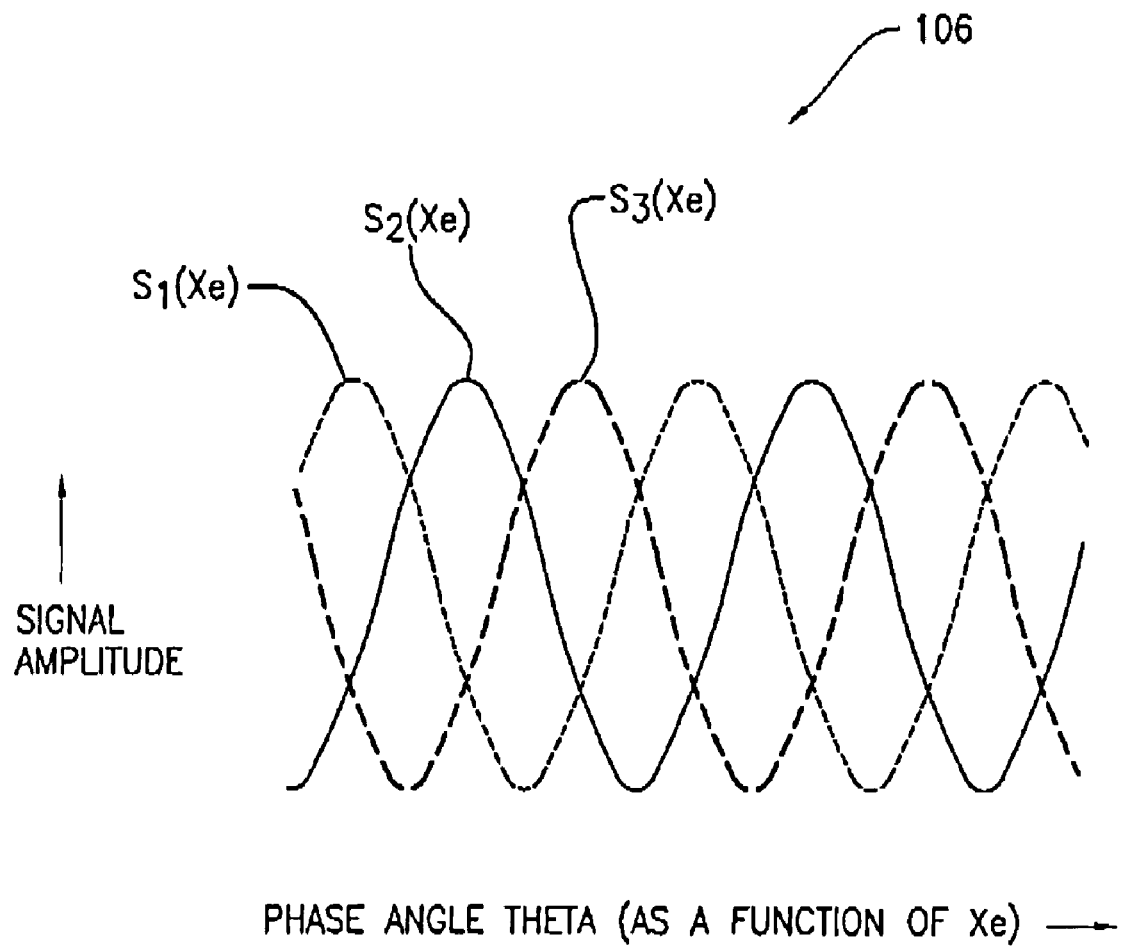
FIG. 8A is a representation of a plot of predetermined signal values as a function of pre-identified positions for comparison with the measured sensor signals for the embodiment of FIG. 7.

The sensed signals are sinusoidal and represented as a measured signal set $[S_1(Xa), S_2(Xa), S_3(Xa)]$ as a function of actual shaft position Xa. To perform the error calculation, a predetermined signal set $[S_1(Xe), S_2(Xe), S_3(Xe)]$ 84 as a function of each pre-identified (also referred to herein as estimated) shaft position Xe is obtainable, where each ordered value $S_i$ in a set represents a model of an actual sensor 78 in the array. Accordingly, a plot of each predetermined sensor signal as a function of Xe 106 for this example will also be sinusoidal, as shown in FIG. 8A.

Figure 8B:
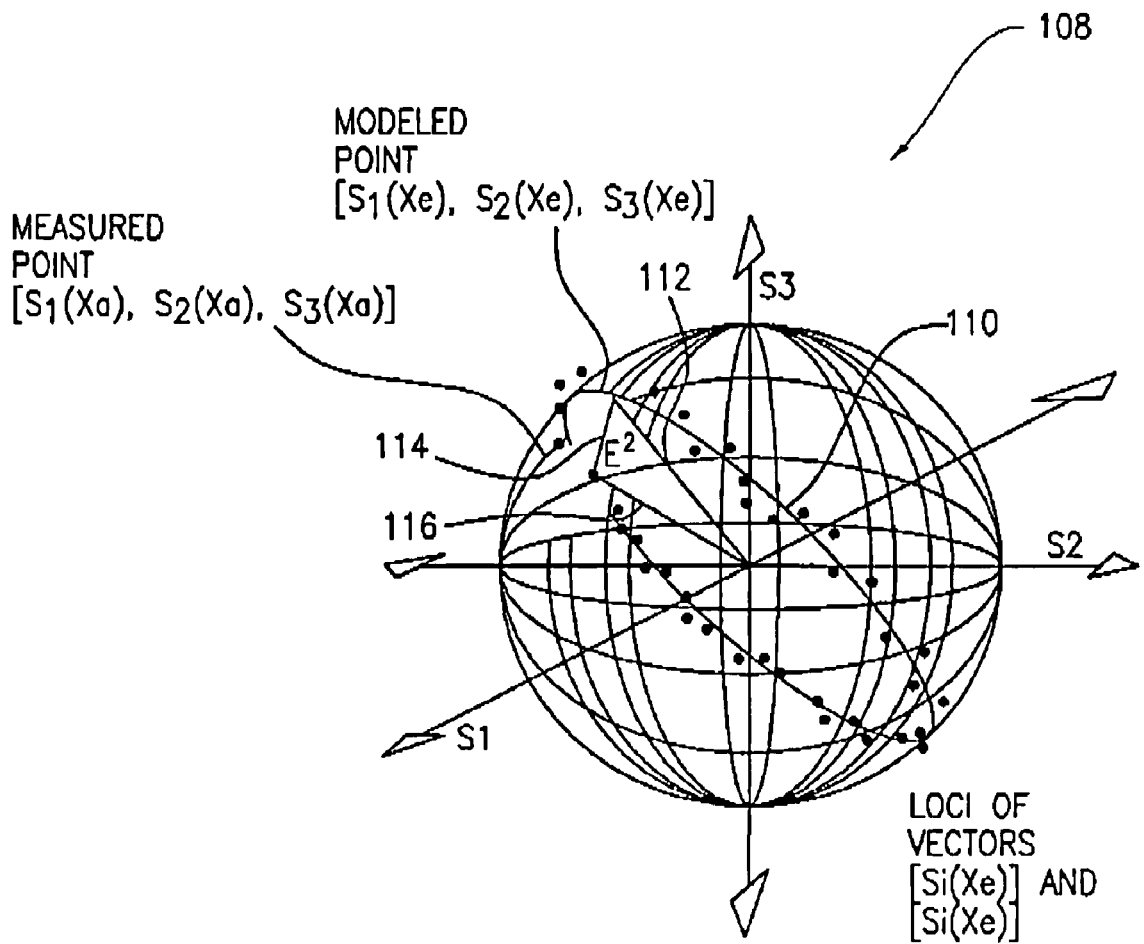
FIG. 8B is a representation of the loci of sets of sensor signals from the three sensors of FIG. 7 measured at various positions Xa, which surround a circle defined by the sets of predetermined signal values of FIG. 8A for each position of the member relative to the sensor array.

Both measured and pre-determined sets can be represented as in FIG. 8B in three dimensional Cartesian coordinates 108, where the associated pre-identified data points lie on a perfect circle 110. The locus of all measured data points forms a cloud in the approximate shape of a torus. The scattering of the points represents noise in the signals, without which the scattered points would together lie on a perfect circle. Accordingly, the measured sets of sensor signals represent points which comprise the signal set $[S_1(Xa), S_2(Xa), S_3(Xa)]$. These measured data points surround the circle 110, which represents all predicted data points $[S_1(Xe), S_2(Xe), S_3(Xe)]$ estimated by an ideal model of the sensor signals.

The circle 110 is further represented by a position vector 112 of length equal to the vector magnitude of a predicted data point $[S_1(Xe), S_2(Xe), S_3(Xe)]$ at the estimated position Xe. Xe is a linear function of the angle of the position vector which precesses around the circle as the estimated shaft position changes. As such, Xe in turn represents the phase angle of the predicted sensor signal set [$S_1(Xe)$, $S_2(Xe)$, $S_3(Xe)$].

Figure 8C:
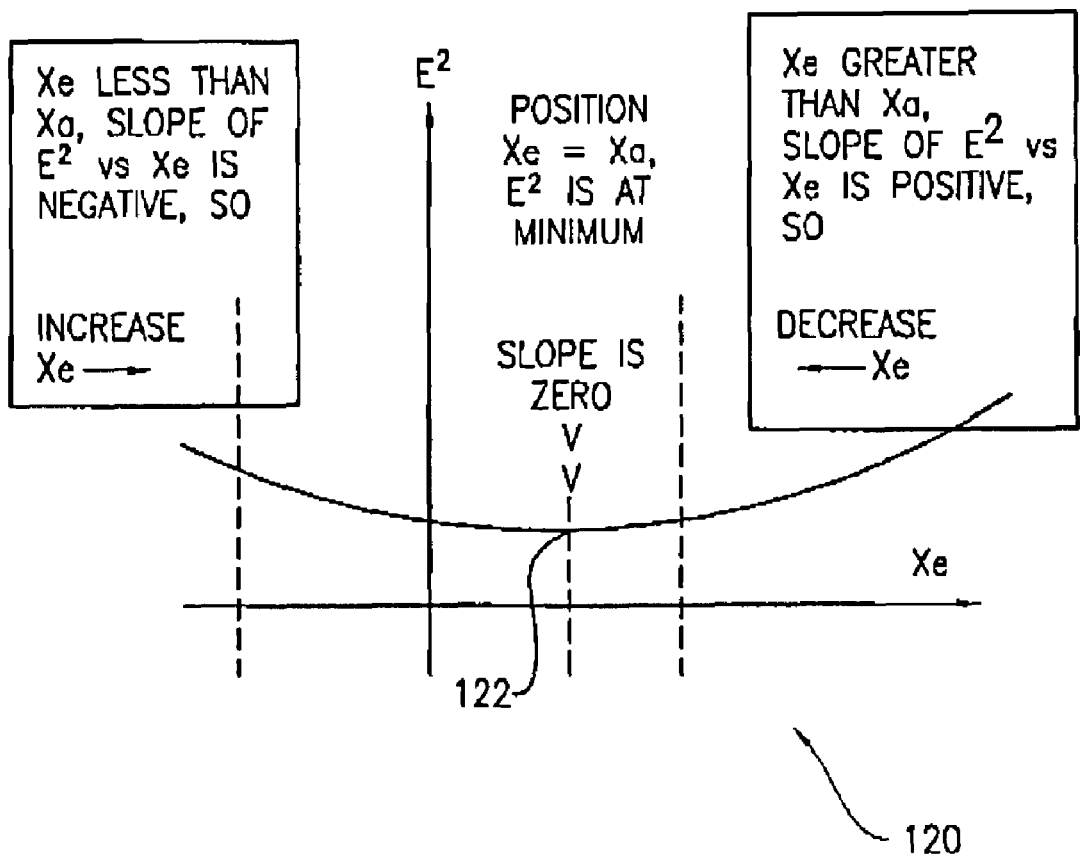
FIG. 8C is a representative plot of a variation in error Magnitude $E^2$ graphed as a function of Xe with Xa fixed.

The closest estimated position, where Xe equals or most closely approximates Xa, is found by finding the angle Theta (or position Xe) for which the square $E^2$ of a vector distance E 114 between the vector 116 representing the currently measured point and one of the vectors representing modeled points Xe is at a minimum. In particular, referring to FIG. 8C as well as to FIG. 6, the measured signal set [$S_1(Xa)$, $S_2(Xa)$, $S_3(Xa)$] 74 is sensed by the interpolator circuitry (not shown) and compared in the error signal calculator 90 with the estimated signal set [$S_1(Xe)$, $S_2(Xe)$, $S_3(Xe)$] 84 corresponding to the interpolator output position Xe. An error magnitude $E^2$ 120 is determined for at least two of the pre-determined signal sets [$S_1(Xe)$, $S_2(Xe)$, $S_3(Xe)$] 84. $E^2$ represents the squared magnitude of the vector error between the vector [$S_1(Xa)$, $S_2(Xa)$, $S_3(Xa)$] 116 representing sensed sensor signals corresponding to the shaft position Xa and the vector [$S_1(Xe)$, $S_2(Xe)$, $S_3(Xe)$] 112 of modeled sensor signals corresponding to the position output Xe. A plot of $E^2$ as a function of Xe is shown in FIG. 8C

The slope of error magnitude $E^2$ is then calculated and multiplied by a factor k to generate error signal 92. The result is subtracted from the position output signal Xe in indexing module 94, for example, to yield position output signal 80. In this way, a progressively closer approximation of Xe to the actual shaft position Xa can be obtained.

In particular, the slope of error magnitude $E^2$ is calculated from the square of error magnitude $E^2$, which, as is commonly known in mathematics, is calculated by summing the squares of the differences between the individual vectors per the equation:

$$E^2 = \Sigma \{S_i(Xe) - S_i(Xa)\}^2$$

Where

Xe is the previous position output calculated by the interpolator

Xa is the actual shaft position $S_i(Xe)$ is each of N modeled Sensor signals dependent on Xe $S_i(Xa)$ is each of N sensed signals $S_i(Xa)$ which is dependent on Xa As illustrated in FIG. 8C, $E^2$ becomes smaller when the position output signal and actual shaft position values are closer to one another, and $E^2$ becomes large when the position output signal and actual shaft position values are further from one another. A slope m can be described, which represents the change in $E^2$ as a function of change in estimated position Xe. As such, slope m is mathematically identical to the first derivative of $E^2$ with respect to Xe.

Statistical error Signal Calculator 90 determines the slope m of $E^2$ and increases the position output if the slope m is negative, or decreases the position output if the slope is positive. Inspection of FIG. 8C reveals that this process will always move the output position in the direction of the minimum 122 of $E^2$, where the error between the output position and the actual shaft position is at a minimum.

In this manner, the direction and amount in which the estimated position Xe needs to be adjusted in order to make $E^2$ as small as possible is calculated and, as a consequence, the position output 80 identifies, as closely as possible, the actual shaft position. One skilled in the art will appreciate that a calculation of the minimum of $E^2$ performed in this manner is statistical when more than two sensors are used, as in the present invention.

The direction and amount in which the estimated position Xe needs to be adjusted in order to make $E^2$ as small as possible is calculated as follows. The slope m of the square of an error magnitude $E^2$ can be calculated, as is commonly known in differential calculus, by evaluating the first derivative of $E^2(Xe)$ with respect to Xe:

$$m = \frac{dE^2(Xe)}{dXe} = 2 \times \sum S_i(Xe)' \{S_i(Xe) - S_i(Xa)\}$$

Where:

Xe is the position output by the calculation of Xe k is a factor used to control speed and resolution $S_i(Xe)'$ is the mathematical first derivative of each of N modeled Sensor signals $S_i(Xe)$ with respect to Xe $S_i(Xe)$ is each of N modeled Sensor signals dependent on Xe $S_i(Xa)$ is each of N sensed signals $S_i(Xa)$ which is dependent on Xa To calculate the position output signal Xe the slope m is multiplied by a factor k and then subtracted in a processing step 94 from the previously calculated position output Xe, to result in the new position output value Xe per the following equation:

$$Xe = Xe - k \times m$$
$$= Xe - k \times \sum S_i(Xe)' \{S_i(Xe) - S_i(Xa)\}$$

The resulting statistical estimation of Xe becomes closer to the actual shaft position Xa with each successive calculation of Xe. k can be any constant, chosen for accuracy and speed in making the calculations. If k is chosen sufficiently small, then the interpolator position output can be made to increment by only one count per clock cycle. On the other hand, k can be chosen sufficiently large to enable multiple positional increments during a single cycle when the following error is large. In this manner, higher shaft speed can be tracked by the interpolator, without losing output positional count. Equivalently, less expensive development costs can be achieved in the hardware design of the interpolator, without losing positional count by implementing the interpolator method in a programmable digital signal processor (DSP) with a slower clock speed instead of a custom integrated circuit with higher clock speed.

In one embodiment of the system and method of the present invention, an improved estimation can also be provided by additionally correcting the sensor signal amplitude variations by multiplying the modeled signals $S_i(Xe)$ by an appropriate correction factor R, where correction factor R is the ratio of the modeled and sensed sensor signal magnitudes:

$$R = \sqrt{\Sigma S_i^2(Xe)} / \sqrt{\Sigma S_i^2(Xa)}.$$

Accordingly, the system and method of the present invention provide an interpolation of the output position signal Xe with a lower level of positional noise than possible with the prior art. In particular, it is a known characteristic of a set of random, uncorrelated noise sources that such noise signals will add quadratically, that is, the square of the average noise magnitude will equal the sum of the squares of the individual signals, as described in Lindberg and VanderZiel, "Flicker Noise in Indium Antimonide Hall Devices," Masters Thesis, 1980. As such, the resulting noise level is effectively less than a simple summation of the signals would imply.

In another embodiment, the method of the present invention includes accommodating signal offset variations by adding sensor signals from complementary sensor pairs in the array of sensors provided.

Sensor signals can contain certain offset values in addition to the periodic signals used for sensing position along a defined path 134. Typically, such offset values do not vary with position (as in those due to sensor construction) or vary only slowly with position, as in the slowly varying magnetic field along a periodic array of magnets 136, which may be due to proximity of fringing fields at the ends of the periodic array, or by proximate ferrous metal objects.

Offset values due to sensor construction can be measured for each sensor in a zero field environment, and accommodated by suitably adjusting the interpolator model or by sensor calibration. Offset values due to field offsets are not as predictable, however, and a different technique is required to deal with these. The technique as described below exploits the common situation in which slowly varying field offsets, which are difficult to predict, change with position by a sufficiently small amount as to remain nearly effectively invariant in offset amplitude over the positional distance of one period cycle.

Figure 9A:
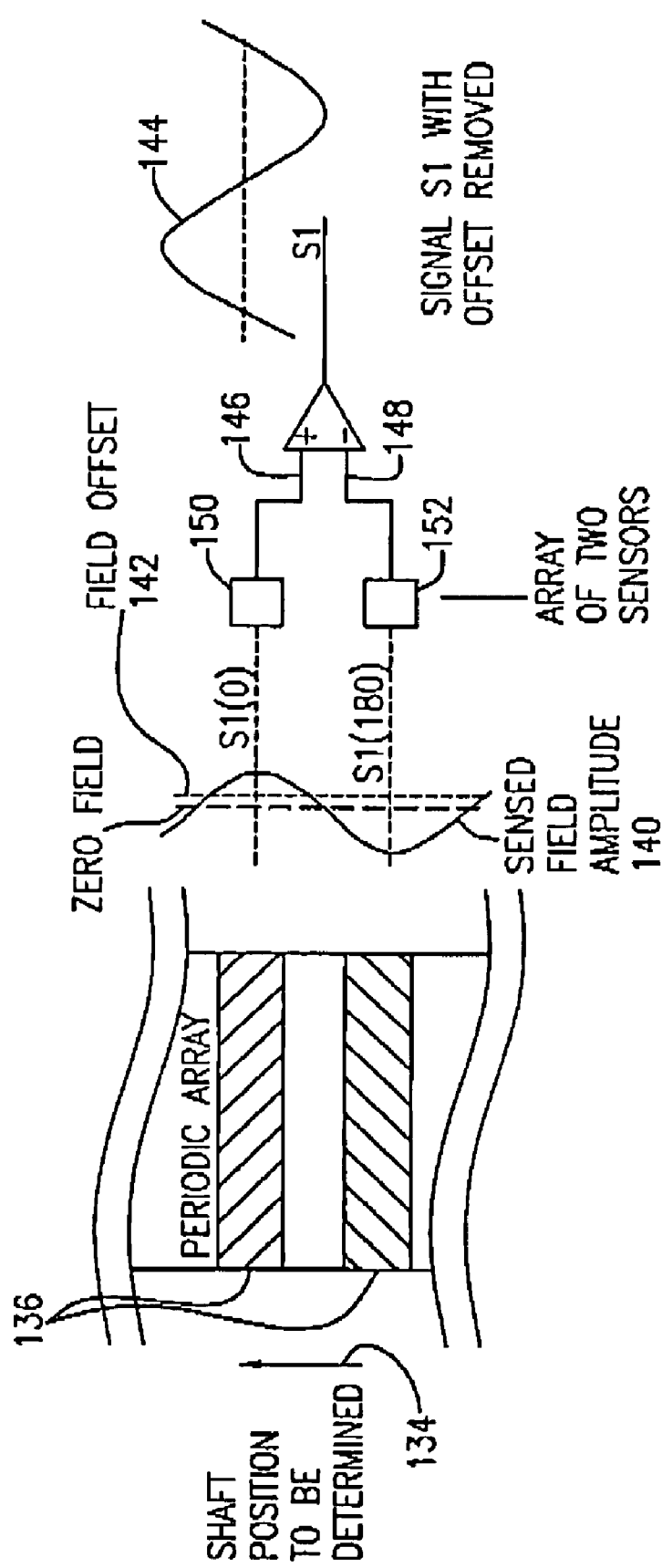
FIG. 9A is a schematic representation of an apparatus and method for field offset amplitude compensation according to an embodiment of the present invention.

The periodic sensed field 140 in FIG. 9A comprises a useful periodic signal and a superimposed, slowly varying offset component 142 to be compensated for. Assuming that sensor device signal offsets are already accounted for, the sensor signal $S_1$ 144 results in subtracting the signal 146 of a sensor $S_1(0)$ from that 148 of a complementary sensor $S_1(180)$.

Sensors $S_1(0)$ 150 and $S_1(180)$ 152 comprise a complementary sensor pair, that is, they are physically located, respectively, at positions in which each sensor senses the periodic field at a position which is shifted in phase by 180 degrees from that signal detected by the other sensor.

As an example in which the signals are sinusoidal and of amplitude Vp, and in which a field Offset Signal at 0 degrees equals the Offset Signal at 180 degrees, the resulting operation yields mathematically the following result:

$$S_1(0) = Vp * \text{Sin}(0 \ deg) + \text{Offset Signal at zero degrees};$$

$$S_1(180) = Vp * \text{Sin}(180 \ deg) + \text{Offset Signal at 180 degrees}$$

$$\begin{aligned}S_1 &= S_1(0) - S_1(180) \\ &= Vp * \text{Sin}(0) - Vp * \text{Sin}(180) + \text{Offset at zero degrees} - \\ &\quad \text{Offset Signal at degrees} \\ &= 2 * Vp * \text{Sin}(0).\end{aligned}$$

Figure 9B:
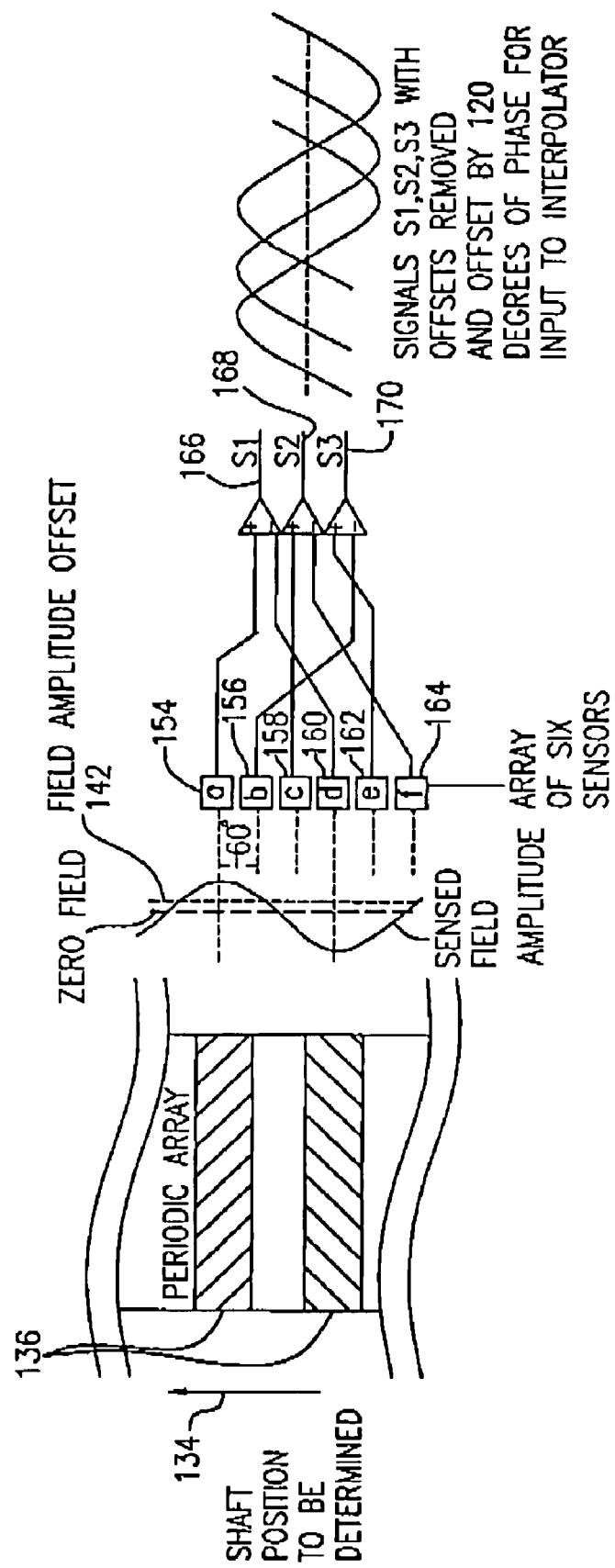
FIG. 9B is a schematic representation of the embodiment of FIG. 9A in which a total number of sensors is six, forming three complementary pairs of sensors with three corresponding sensor signals.
Figure 10A:
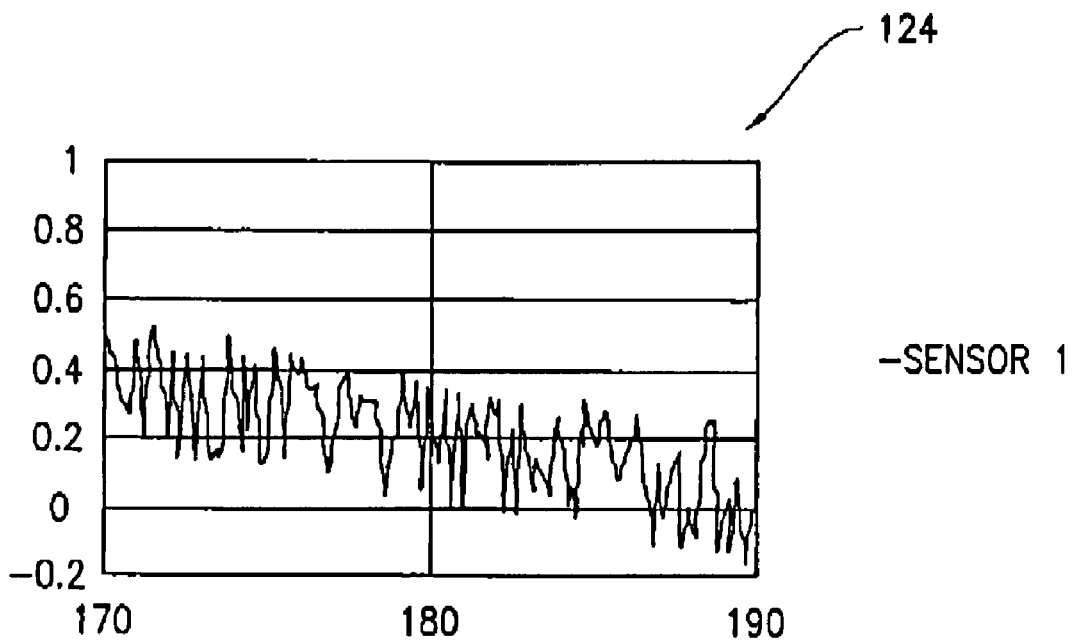
FIGS. 10A-C are representative plots of three measured sensor signals as a function of positional phase angle.
Figure 10B:
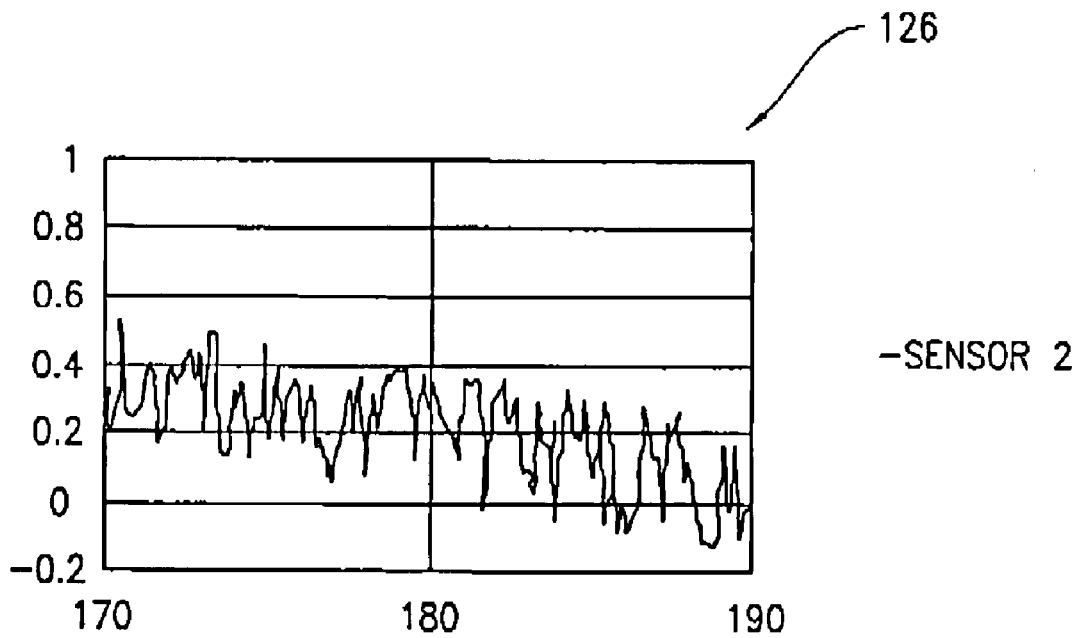
Figure 10C:
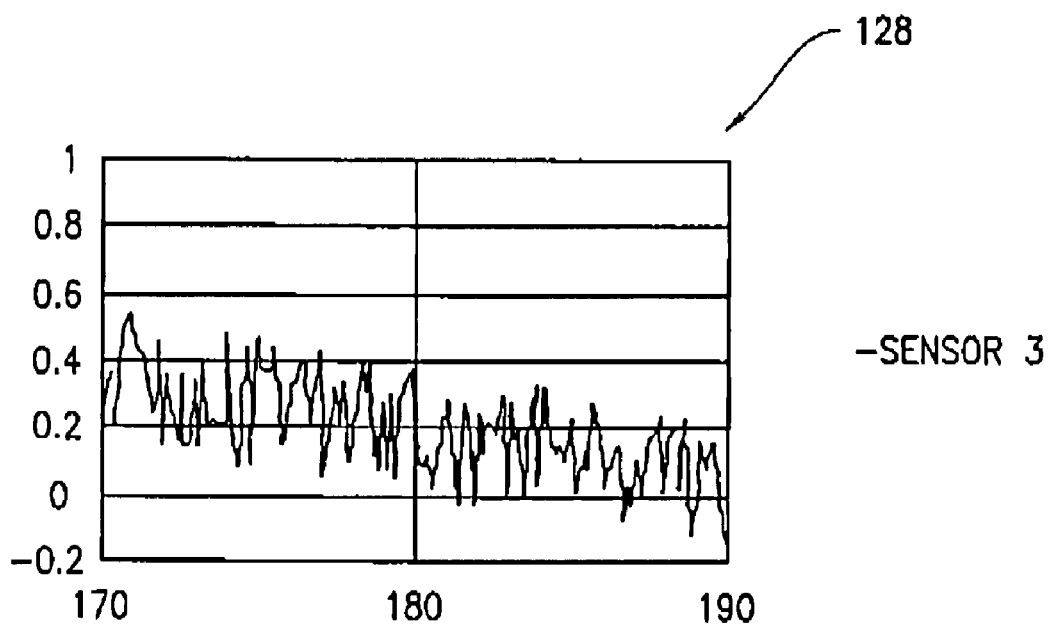
Figure 10D:
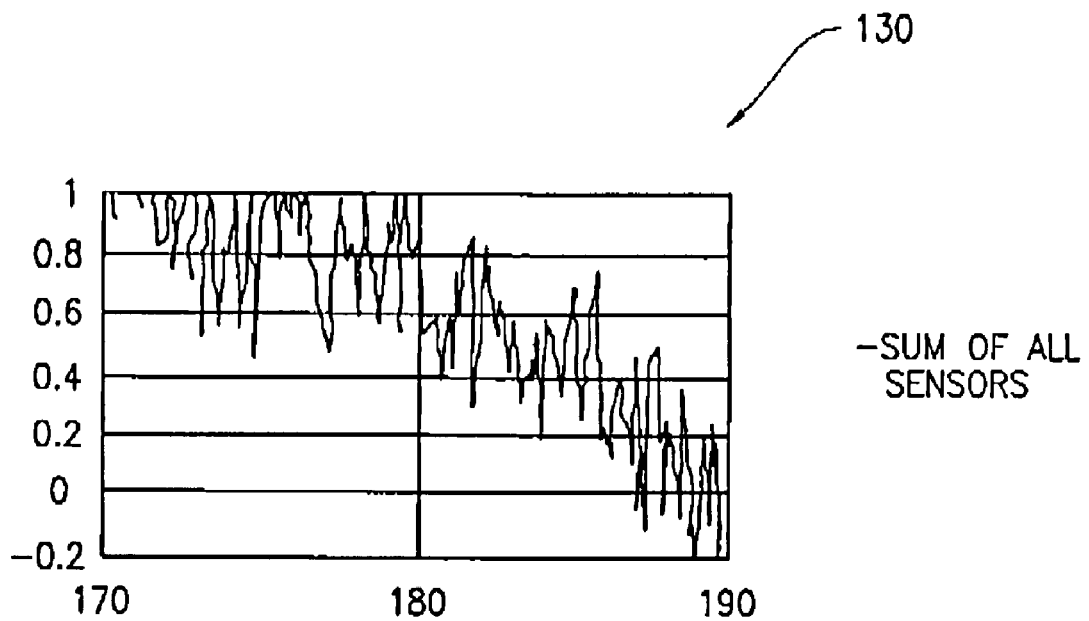
FIG. 10D is a plot showing the addition of the three sensor signals of FIGS. 10A-C showing the improved Signal to Noise ratio.

One example of a system in which N=3 is illustrated in FIG. 9B and represents a method used in a preferred embodiment of the invention. The phase separation between the N sensors is chosen as (180/N)×2 or 120 degrees. The resulting phase separation between adjacent individual sensors is 60 degrees.

Sensors a 154, b 156, c 158, d 160, e 162, and f 164 comprise the following array of complementary sensor pairs: a and d, where a-d generates signal $S_1$ 166; c and f, where c-f generates signal $S_2$ 168; and e and b, where e-b generates signal $S_3$ 170. With a spacing of 60 degrees between adjacent sensors, three signals are produced with a mutual phase offset of 120 degrees. This design removes that field offset component which is common to both sensors in each pair, and provides improved signal amplitude for input to the interpolator.

Referring to FIGS. 10A-10D, the summation 130 of three sensor signals 124, 126 and 128 plotted as a function of positional phase angle on the horizontal axes results in a linear summation of useful positioning information, but the random noise, adding quadratically, is only 1.7 times as great as that from a single sensor. As a result, the signal to noise ratio, which for a 20 degree positional change from 170 to 190 degrees cannot be resolved by any such signal alone, can be clearly resolved by the signal resulting from the sum of all sensors.

The signal to noise ratio thus improves by a factor equal to the square root of N, or in this case by a factor of the square root of three. It is readily apparent that the interpolation of greater number N of sensors by the interpolator will result in a correspondingly greater precision of the positional output signal, provided the sensors are placed so that they provide a greater number of signals providing simultaneously good slope, as when their outputs are shifted in phase by 180/N degrees, or a multiple thereof.

It will be readily apparent to those skilled in the art that an equivalent improvement in signal to noise ratio can be achieved in an interpolator by generating each sensor signal by linearly summing the outputs of any number of individual sensors devices, whether or not such individual sensor devices are positioned to be of complementary phasing. An example of such usage occurs in arrays of magnetoresistive sensors, in which individual sensors are implemented by connected magnetically sensitive resistors in series circuits, and in which such resistors may be located at different phase positions. By analogy, this approach would apply to summing the output voltages of HALL sensors in a mathematically equivalent manner.

For purposes of the description of the prior art and for description of this invention, such linear summation of the signals of individual sensor devices to generate interpolatable sensor signals is treated as the usage of a single sensor, except for the case in which the invention performs offset compensation through the use of substantially complementary summation.

In addition, interpolator 72 can also interpolate the output position signal Xe with better linearity than possible with the prior art. In particular, previous periodic signals of differing phase will add in such a way as to partially or completely cancel, depending upon their relative phase with respect to one another. As such, the resulting nonlinearities are effectively less than a simple summation of the signals would imply, and in some situations can be considerably less than would result from the nonlinearities resulting from the interpolation of one sensor signal pair alone.

Figure 11A:
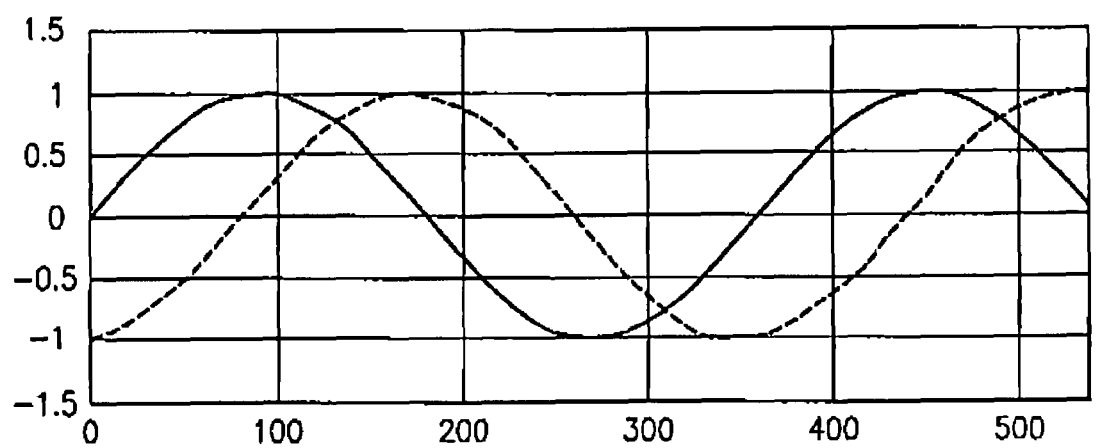
FIGS. 11A-C are representative plots of the addition of three sensor signals and improved Output Position Linearity.
Figure 11A:
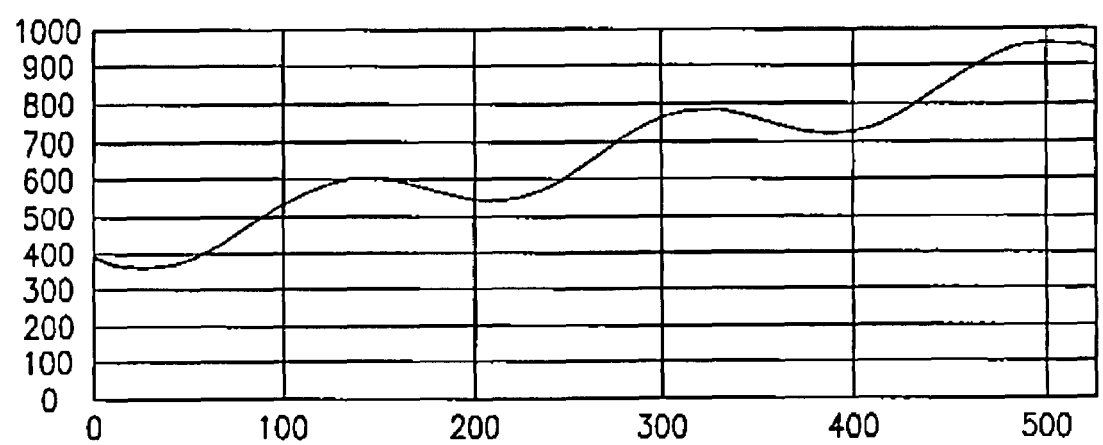
Figure 11B:
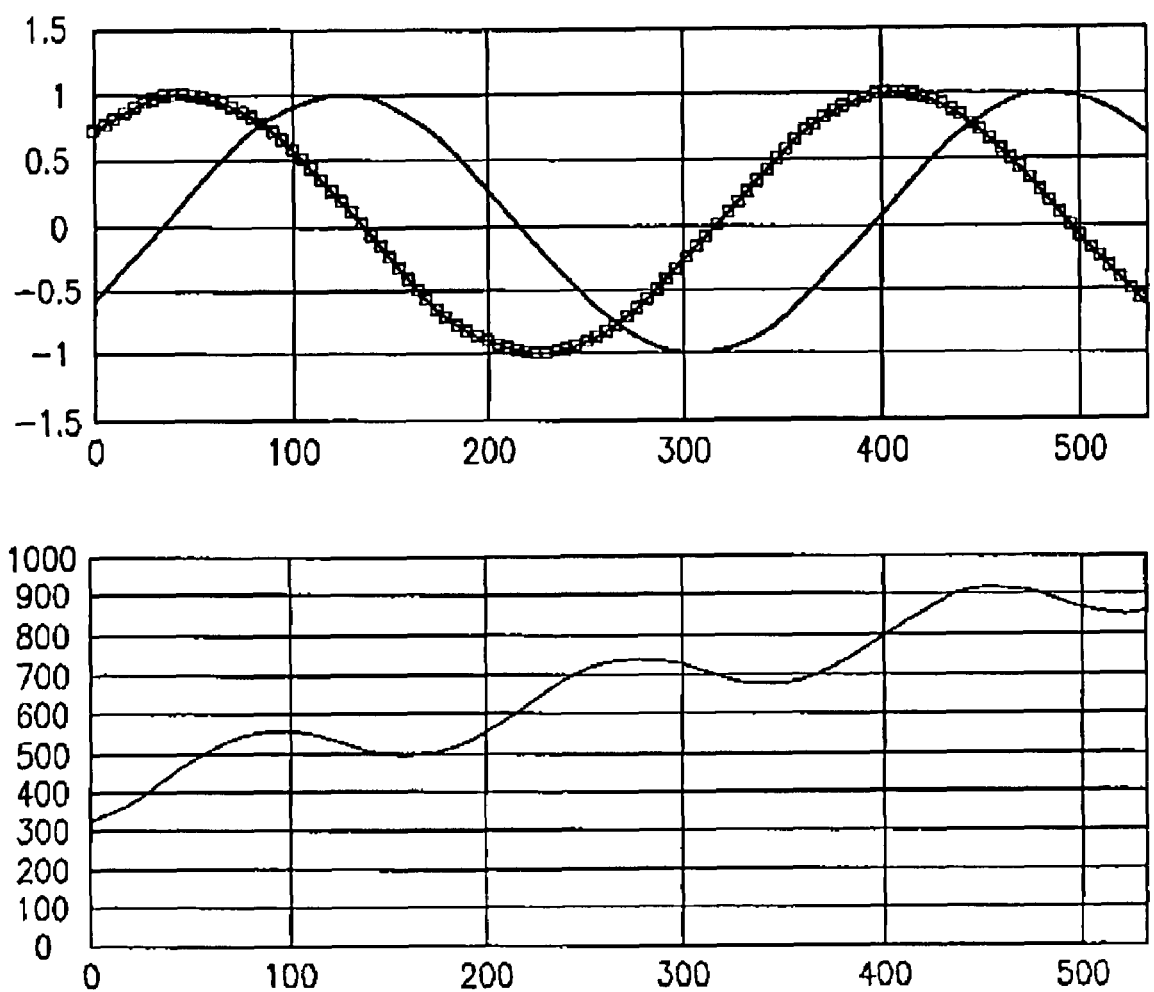
Figure 11C:
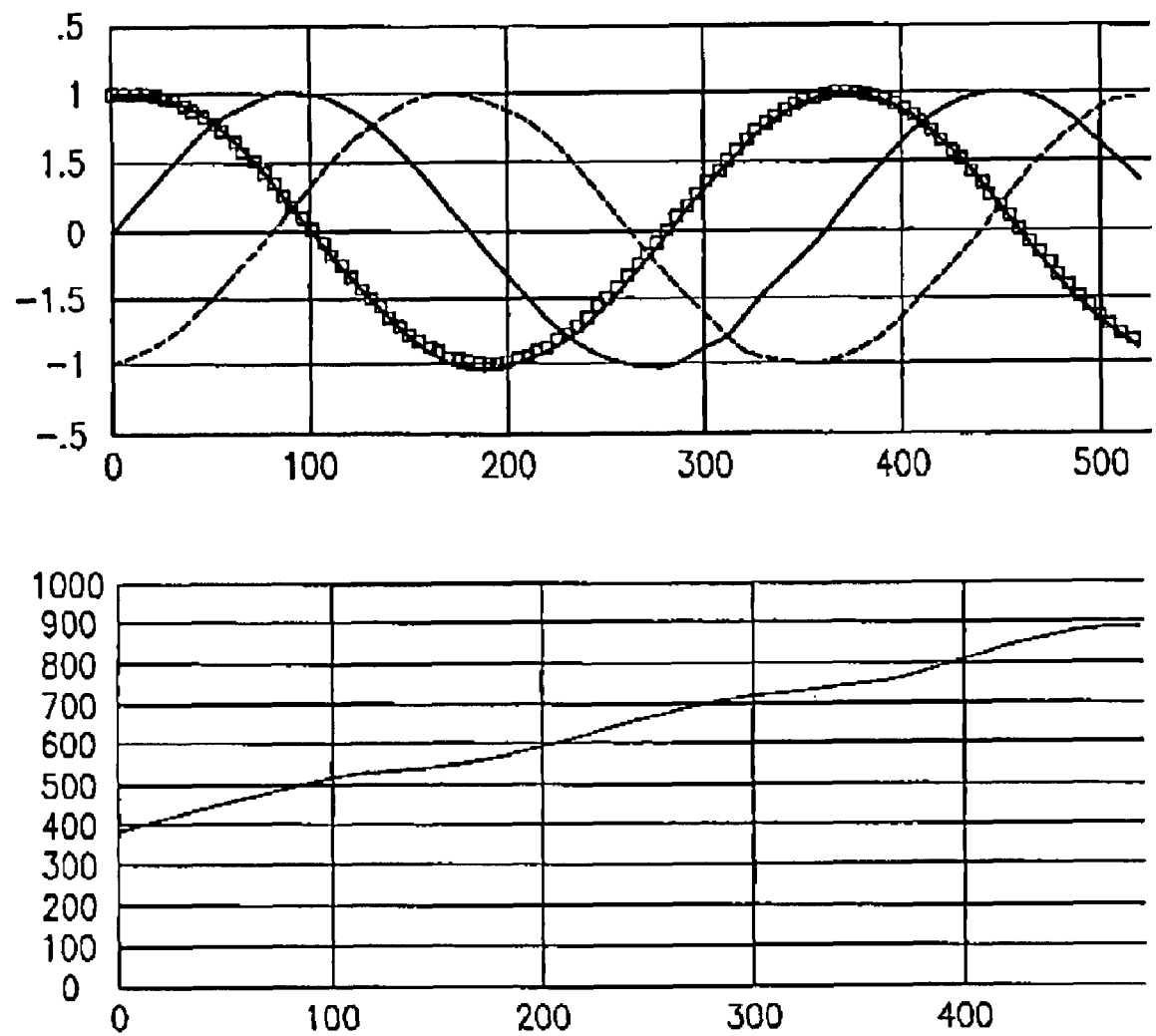

The summation of the three sensor signals, as illustrated in FIGS. 11A-C, results in a linear summation of useful positioning information, but the nonlinearities, adding out of phase with respect to one another, are only 1/10 times as great as that from a single sensor.

As a result, the output position linearity improves by a considerable degree, depending upon the number of sensors and their relative phasing. One skilled in the art will appreciate that the prior art systems for position detection cannot readily achieve this level of linearity due to their inability to effectively use more than one sensor signal at all shaft positions. As a result, a correspondingly greater precision of the positional output signal is provided by the system and method of the present invention compared to that obtainable with the prior art.

In addition, all shaft positions can benefit from the improved signal to noise ratio of the invention and from the improved signal linearity of the invention, because more then two sensor signals are being used at every shaft position. Conversely, in the prior art, there are four shaft positions within every positional cycle in which only one sensor is being used for position estimation and the signal to noise ratio as well as the position output signal linearity are not improved at these positions. It is further asserted that no means is readily available in the prior art to combine more than two signals for use in deriving the error signal needed for interpolation.

Description of Method of Modeling Sensor Signals Si (Xe)

The interpolator of the present invention embodies as part of its function a set of expected sensor signals $S_i(Xe)$ as a model. Sensor signals $S_i(Xe)$ are intended to correlate with the measured set of sensor signal levels $S_i(Xa)$ for every condition in which output position Xe is equal to actual position Xa.

In a preferred sensor implementation, the model for signals $S_i(Xe)$ is created for the interpolator by initially measuring the outputs of all sensors at known shaft positions and creating the lookup table 86 which stores the values of signals $S_i(Xe)$ in memory locations addressed by a scaled representation of the position variable Xe as an index pointer. Other values can also be used as the index pointer, which may be calculated, scaled, or converted in a conversion module 95 embodying these processing steps. The values stored in the lookup table then become part of the interpolator for purpose of calculating Xe during normal interpolator operation.

Alternatively, or in combination with the storage of the model of signals $S_i(Xe)$ as terms or as parts of terms in a lookup table, the model of signals $S_i(Xe)$ may be represented in the form of a mathematical equation which represents parameters of a curve fit or other such means of predicting values of modeled sensor signals $S_i(Xe)$ given output position values Xe. It should also be noted that in the calculation of Xe that some of the stored table values of $S_i(Xe)$ may not strictly represent sensor measurement values alone, but may also include the values $S_i(Xe)$ as part of pre-calculated terms to save calculation time during actual interpolator operation.

It is necessary, in many applications, to provide positional data which spans distances greater than the distance between a pair of shaft magnet poles. This can be accomplished automatically by the position counter or index pointer in the forgoing descriptions, by using only the lower order bits of the position word to address Lookup Tables 86 in the predetermined sensor signal module 89. Longer Lookup Tables can of course address more than one cycle, in order to correct for cycle-to-cycle variations in shaft field 82.

Estimated position Xe can be output to the application as a byte-parallel digital word, or translated into Digital A Quad B format. Additionally, other output signal formats are possible, and within the spirit and scope of the invention.

Further variations are also possible without departing from the spirit of the invention. Sensor array A can include Analog to Digital Converters and the signal can be processed in Analog or digital form by either electronic circuits or by computer software in numerical form. Sensor signal model module 89 can be an equation, lookup table, electronic hardware or any combination of the forgoing.

Additionally, Lookup Table operations may be combined with linear interpolation means to minimize the required table length and to improve table resolution. Further, any other means of input scaling can be applied to correct the input sensor amplitudes, such as sensor voltage supply scaling, table value scaling or separate scaling operations on the sensed inputs in order to enable the least squares algorithm to minimize the undesired position errors resulting from harmonic distortion in the sensed field.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for identifying the position of a first member relative to a defined path; said path being defined by a second member; one of said first and second member providing a periodic field along at least a portion of said defined path, said method comprising:
   (a) providing a plurality of predetermined sets of N sequentially ordered values, where N is greater than 2, each set associated with a pre-identified position of said first member relative to said defined path;
   (b) providing an array of spaced field sensors positioned at fixed locations with respect to the one of said first and second member not providing said periodic field and adjacent to at least a portion of said defined path, each of said field sensors sensing said portion of said periodic field at its fixed location and thereby generating a sensor signal in response thereto to provide a set of N sensor signals in a predetermined sequence associated with the position of said first member relative to said defined path;
   (c) comparing said set of N sensor signals to a first one of said plurality of predetermined sets of N sequentially ordered values associated with a first pre-identified position to generate a correction signal; and
   (d) using said correction signal to choose another pre-identified position associated with another one of said plurality of predetermined sets as an approximation of the position of said first member relative to said defined path; and
   (e) generating a position output signal associated with said approximation of the position from step (d).

2. The method of claim 1, further comprising:
   (f) setting said first one of said plurality of predetermined sets in step (c) to said another one of said plurality of predetermined sets associated with said another pre-identified position chosen in step (d) as said approximation of the position in response to said generating step (e), and iteratively repeating steps (c), (d), and (e) to find a minimum correction signal, thereby identifying the position of said first member relative to said defined path.

3. The method of claim 2, said comparing step (c) comprising calculating a square of the magnitude of the difference between said set of N sensor signals and at least said first one and a second one of said plurality of predetermined sets of N values for each of said at least said first and said second predetermined sets to generate at least two error values that are a function of pre-identified position.

4. The method of claim 3, said comparing step (c) further comprising calculating a slope of said function defined by said at least two error values to determine a direction and amount by which said at least two error values change as a function of pre-identified position, at said first pre-identified position.

5. The method of claim 4, said comparing step (c) further comprising multiplying said slope by a scaling factor to generate a correction value associated with said correction signal.

6. The method of claim 5, said using step (d) comprising subtracting said correction value from said first pre-identified position to choose said another pre-identified position.

7. The method of claim 5, wherein said correction value corresponds to said minimum correction signal, each of said slope and said correction value is zero, said another pre-identified position equals said first pre-identified position, and said output position signal identifies said first pre-identified position as the position of said first member relative to said defined path.

8. The method of claim 5, wherein said scaling factor is a positive or negative constant value.

9. The method of claim 5, wherein said scaling factor is automatically adjusted at every iteration of said comparing step.

10. The method of claim 1, said providing step (a) comprising providing a table of said plurality of predetermined sets of N ordered values indexed by said pre-identified positions associated therewith, and wherein said using step (d) comprises stepping an index pointer in said lookup table to choose said another pre-identified position.

11. The method of claim 10, further comprising storing said table in addressable memory locations and calculating said index pointer from a scaled representation of said pre-identified positions, wherein said stepping comprises addressing said addressable memory locations using said index pointer to choose said another pre-identified position.

12. The method of claim 1, wherein said first member is moving relative to said second member, said method comprising identifying the position of said first member relative to said defined path in a time interval less than a time of travel of one step of said first member from a first position to a second position, wherein a response time of a feedback loop providing said comparing (c), using (d) and generating (e) steps is less than the inverse of a stepping velocity in steps/second of said one of said first and second members that is moving relative to said defined path.

13. The method of claim 1, wherein said array of spaced field sensors comprises M sensors spaced by a distance corresponding to a non-zero integer multiple of 180/M degrees of said periodic field.

14. The method of claim 13, wherein M equals N, each of said spaced field sensors providing one of said N sensor signals.

15. The method of claim 13, wherein M equals two times N, said providing step (b) comprising providing said array as N pairs of regularly spaced field sensors, each pair comprising one field sensor physically located relative to the other field sensor to sense said periodic field shifted in phase by 180 degrees relative to the other field sensor, said array generating N combined sensor signals from said sensor signals to provide said set of N ordered sensor signals associated with the position, said method further comprising generating said N combined sensor signals by subtracting one sensor signal generated by said one field sensor from a second sensor signal generated by said other field sensor for each of said N pairs, thereby substantially compensating for slow field offset variations.

* * * * *